(12) United States Patent
Villette et al.

(10) Patent No.: US 11,112,190 B2
(45) Date of Patent: Sep. 7, 2021

(54) PASSIVE THERMAL DIODE FOR PIPELINES

(71) Applicant: Saudi Arabian Oil Company, Dhahran (SA)

(72) Inventors: Thibault Tarik Villette, Al-Khobar (SA); Guillaume Robert Jean-Francois Raynel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 32 days.

(21) Appl. No.: 16/704,973

(22) Filed: Dec. 5, 2019

(65) Prior Publication Data

US 2021/0172689 A1 Jun. 10, 2021

(51) Int. Cl.
*F28F 27/00* (2006.01)
*F28F 13/00* (2006.01)
*F25D 19/00* (2006.01)

(52) U.S. Cl.
CPC ............ *F28F 13/00* (2013.01); *F25D 19/006* (2013.01); *F28F 27/00* (2013.01); *F28F 2013/001* (2013.01); *F28F 2013/008* (2013.01)

(58) Field of Classification Search
CPC ...... F28F 13/00; F28F 27/00; F28F 2013/001; F28F 2013/008; F25D 19/006
USPC ........................................................ 165/277
See application file for complete search history.

(56) References Cited

U.S. PATENT DOCUMENTS

| | | | |
|---|---|---|---|
| 8,716,689 B2 | 5/2014 | Chen et al. | |
| 9,399,866 B2 | 7/2016 | Alawadhi | |
| 9,435,571 B2 * | 9/2016 | Ghoshal | F25B 21/02 |
| 9,927,169 B2 | 3/2018 | Baker et al. | |
| 10,365,049 B2 * | 7/2019 | Tso | F28F 27/00 |
| 2011/0309463 A1 * | 12/2011 | Kruglick | H01L 37/02 |
| | | | 257/467 |
| 2012/0012804 A1 * | 1/2012 | Chen | H01L 23/427 |
| | | | 257/2 |
| 2015/0136234 A1 | 5/2015 | Zulfiquar | |
| 2016/0195344 A1 | 7/2016 | Tomita et al. | |
| 2018/0202726 A1 | 7/2018 | Tso et al. | |
| 2019/0027615 A1 | 1/2019 | Zheng et al. | |
| 2019/0353356 A1 | 11/2019 | Fischer | |
| 2020/0028053 A1 * | 1/2020 | Strano | H02N 11/002 |

FOREIGN PATENT DOCUMENTS

| | | |
|---|---|---|
| CN | 109882683 | 6/2019 |
| WO | WO 2009111008 | 9/2009 |
| WO | WO 2017008748 | 1/2017 |

OTHER PUBLICATIONS

PCT International Search Report and Written Opinion in International Appln. No. PCT/US/2020/063208, dated Mar. 12, 2021, 14 pages.
Elinoff et al, "Thermal diode can control direction of heat flow," Electronic Products Magazine, Apr. 2017, 2 pages.
Wikipedia.com [online] "Thermal Diode," last revised Feb. 2019, retrieved on Oct. 7, 2019, retrieved from URL <https://en.wikipedia.org/wiki/Thermal_diode>, 2 pages.

* cited by examiner

*Primary Examiner* — Davis D Hwu
(74) *Attorney, Agent, or Firm* — Fish & Richardson P.C.

(57) ABSTRACT

A system and method for a passive thermal diode (PTD) to be disposed on a pipeline that inhibits heat transfer from the pipeline to the environment below a threshold temperature and promotes heat transfer from the environment to the pipeline above a threshold temperature.

19 Claims, 15 Drawing Sheets

PASSIVE THERMAL DIODE FOR PIPELINES

TECHNICAL FIELD

This disclosure relates to heat transfer between the environment and transportation pipelines.

BACKGROUND

Pipeline transport is the long-distance transportation of a fluid (liquid or gas) through a system of pipes. The pipe or system of pipes compose the pipeline. The fluid transported through a pipeline may include, for example, water, sewage, or hydrocarbon. The hydrocarbon can be crude oil, natural gas, refined petroleum products or byproducts, etc. The fluid may be moved through the pipelines by compressor stations or pump stations along the pipeline. Natural gas (and similar gaseous fuels) may be pressurized into liquids known as Natural Gas Liquids (NGLs) for pipeline transport. One example material of construction for pipelines is carbon steel. The pipeline may include field gauges and transmitters along the pipeline or at stations for measuring flow, pressure, and temperature. Pipelines may be controlled and operated remotely.

SUMMARY

An aspect relates to a method of operating a passive thermal diode (PTD) disposed on a pipeline. The method includes inhibiting, via the PTD, heat transfer from the pipeline to environment in response to an external temperature being below a threshold temperature. The method includes promoting, via the PTD, heat transfer from the environment to the pipeline in response to the external temperature being above the threshold temperature.

Another aspect relates to a method of operating a PTD disposed on a pipeline. The method includes inhibiting heat transfer from the pipeline to environment via an insulation material layer in an upper portion of the PTD and via a gap in a lower portion of the PTD. The method includes placing a heat-transfer material layer of the PTD in contact with the pipeline to provide for heat transfer from the environment through the heat-transfer material layer to the pipeline, wherein the heat-transfer material layer is placed in contact with the pipeline via thermal expansion of a control material in the PTD.

Yet another aspect relates to a system including a pipeline and a PTD disposed radially around the pipeline. The PTD includes a polymer shell, an inner polymer layer adjacent the polymer shell, a graphene layer between the inner polymer layer and the pipeline in a lower portion of the PTD, and a control material to move the graphene layer into contact with the pipeline.

Yet another aspect is a PTD with phase change material (PCM) giving a PCM-PTD for a pipeline. The PCM-PTD includes a polymer shell, an inner polymer layer adjacent the polymer shell, an insulation material layer adjacent the inner polymer layer in an upper portion of the PCM-PTD, and a heat-transfer material layer adjacent the inner polymer layer in a lower portion of the PCM-PTD to promote heat transfer from environment to the pipeline in response to an external temperature exceeding a threshold. The PCM moves the heat-transfer layer into contact with the pipeline via thermal expansion of the PCM in response to the external temperature exceeding the threshold.

The details of one or more implementations are set forth in the accompanying drawings and the description below. Other features and advantages will be apparent from the description and drawings, and from the claims.

BRIEF DESCRIPTION OF DRAWINGS

FIG. 13 is a diagram of the internal graphene sheet including the inside portion, the outside portion, and an intermediate short portion 1304 there between.

DETAILED DESCRIPTION

Figure 1:
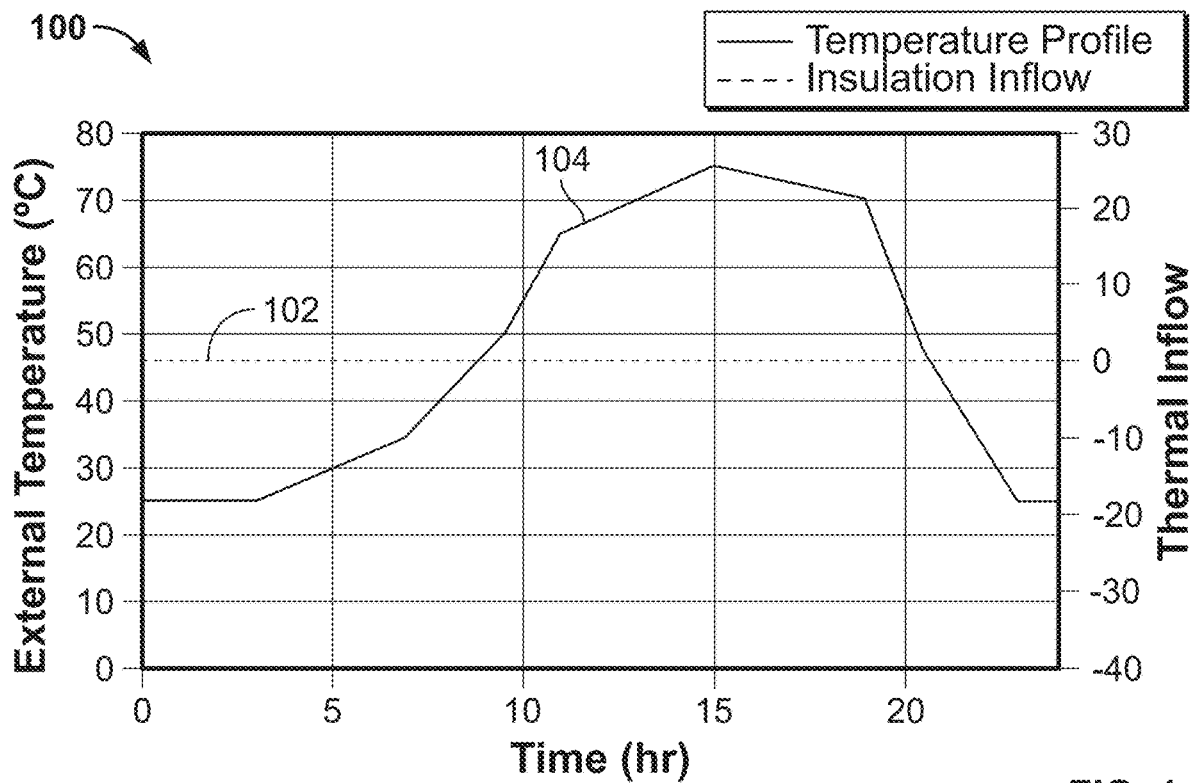
FIG. 1 is a plot of external temperature and thermal inflow over time for a pipeline having insulation.

This disclosure relates to transportation pipelines having a passive thermal diode to affect heat transfer between the pipeline and the environment. Some aspects of the present disclosure are a passive thermal diode (PTD) for pipelines that modulates heat transfer between the pipeline and the environment. The PTD may be passive in that power (or a power supply) is not implemented for operation of the PTD. The PTD may employ a contact switch based on thermal expansion of a material in the PTD. In implementations, this material in the PTD may be a phase change material (PCM) and therefore the PTD may be labeled as a PCM-PTD.

The contact switch may also be labeled as both a mechanical switch and a thermal switch. The contact switch may be thermally driven and have two positions decided by external temperature. One position (no-contact position or insulation position) occurs in response to an external temperature being less than a threshold temperature. The other position (contact position or no-insulation position) occurs in response to the external temperature being greater than the threshold temperature.

The no-contact position of the switch corresponds with a graphene sheet (a thermal conductor) of the PTD not in contact with the pipeline and therefore no heat transfer occurs through the graphene sheet between the environment and the pipeline. The switch operates to the contact position to place the graphene sheet into contact with the pipeline for heat transfer to occur through the graphene sheet from the environment to the pipeline. The functioning of the switch may be driven by thermal expansion of a PTD control material and by dissimilar thermal expansion coefficients of PTD polymer layers.

The PTD (e.g., as a passive thermal rectifier) may passively increase thermal flow into the pipeline and passively reduce thermal flow leaving the pipeline. Therefore, the PTD may facilitate maintaining or increasing temperature of the fluid flowing through pipeline. Accordingly, the PTD may promote maintaining a lower viscosity of the fluid and thus advantageously decrease the amount of motive force needed for flow of the transported fluid through the pipeline.

The PTD may be applied in examples of the transported fluid as crude oil. Once extracted from a well, wet crude oil may be transported to be processed in a gas and oil separation plant (GOSP). Subsequently, the export crude oil is sent to a refinery for processing or to a tank farm terminal (TFT) for storing or shipping. The conveyance of the wet crude oil and export crude oil is generally through pipelines via electromechanical pumps. The flow of these fluids is facilitated by a decrease of viscosity. The viscosity generally decreases when temperature of the fluid increases. Thus, keeping the fluids warm may be beneficial to promote flow of these fluids and to decrease the energy consumption of the conveying pump by decreasing the pumping load or implemented pump head. In addition with decreased pumping load, the longevity and durability of the pump as rotating equipment may be advanced with lessening potential damage, damage propagation, fatigue, and creep.

In certain implementations, as indicated, the present PTD technique may combine an insulator (insulator mode) and an absence of an insulator (no-insulator mode). The insulator may avoid or reduce thermal outflow at low external (ambient) temperatures, such as during the night. The absence of an insulator benefits from thermal inflow to the pipeline at higher external temperatures. Overall, the present solution increases the thermal inflow over a diurnal temperature cycle.

During some times of the year or in certain regions of the world, the swing in ambient temperature between day and night may be substantial. This difference in ambient conditions between day and night may be further amplified due to sun radiant heat during the day. In some examples of desert regions, the temperature in the desert can change significantly from day to night at least because of the dry air.

Figure 2:
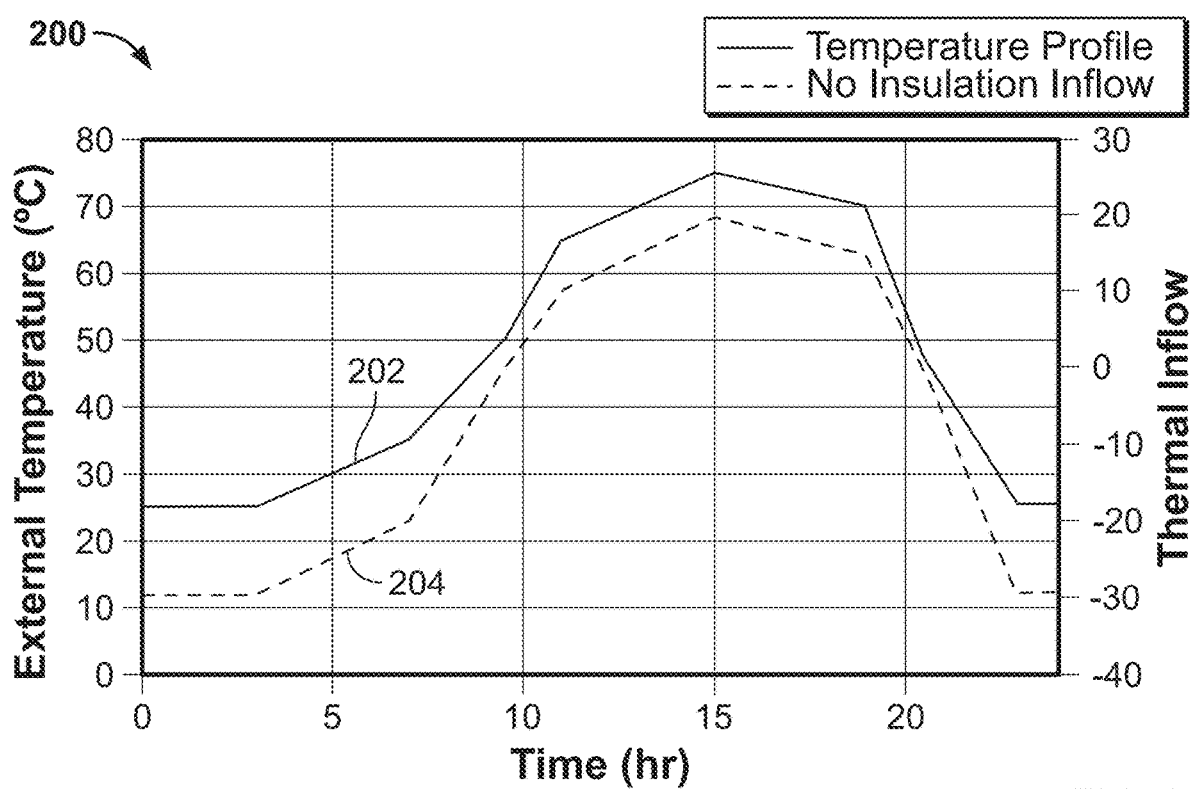
FIG. 2 is a plot of external temperature and thermal inflow over time for a pipeline having an external surface with no thermal insulation.
Figure 3:
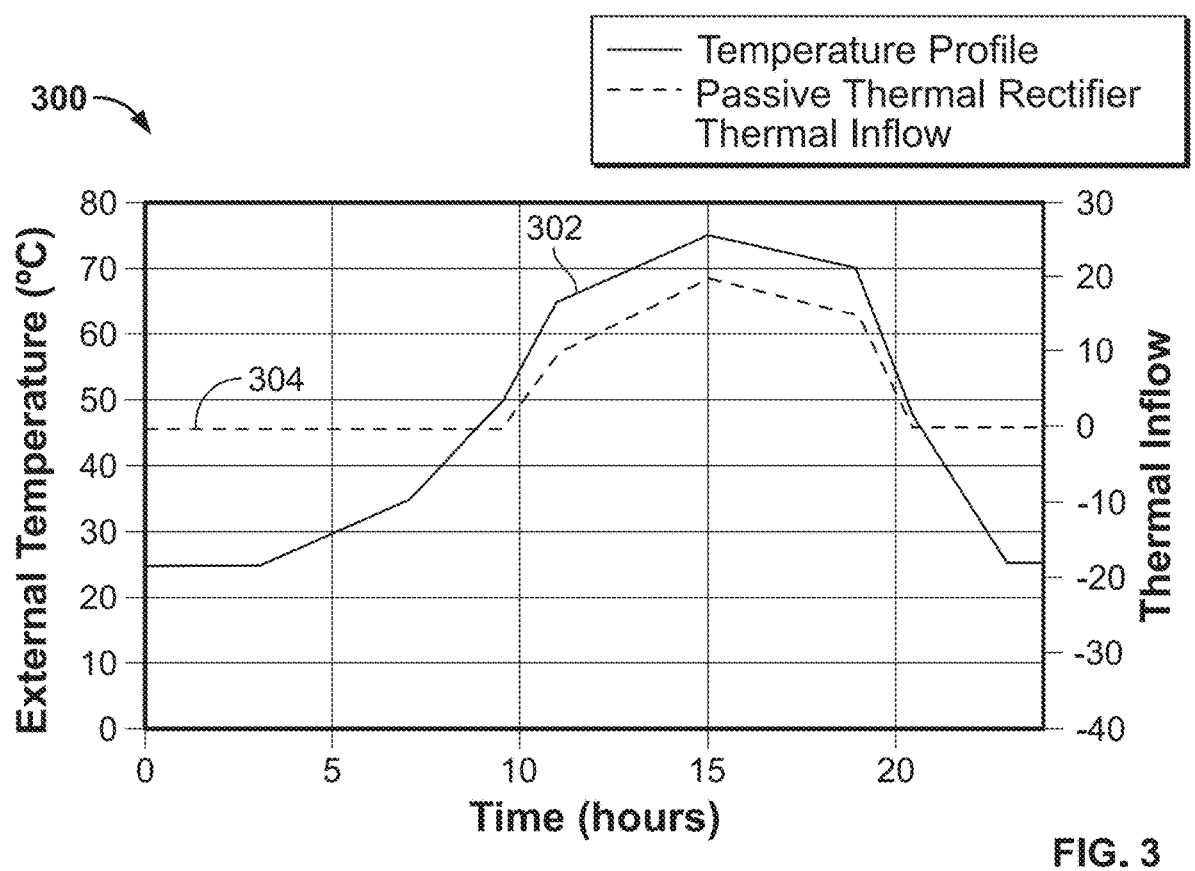
FIG. 3 is a plot of external temperature and thermal inflow over time for a pipeline having an implementation of the present passive thermal diode (PTD).

FIGS. 1-3 collectively compare exemplary thermal inflow profiles for a diurnal temperature cycle for an example pipeline with insulation (FIG. 1) and no insulation (FIG. 2) versus the pipeline having an implementation of the present PTD (FIG. 3).

FIG. 1 is a plot 100 of external temperature (° C.) 104 and thermal inflow 102 in Watt per square centimeters (W/cm$^2$) over time (hours) for a pipeline having insulation. The insulation is thermal insulation installed on (around) the pipeline. The plot 100 is a thermal inflow profile of the pipeline on a diurnal (24-hours) temperature cycle. The thermal inflow 102 is zero due to the pipeline having insulation. The thermal inflow 102 may be the heat transfer between the pipeline and the environment. The external temperature 104 may be the temperature (due to ambient conditions including ambient temperature and sun radiant heat) of the external surface of the insulation or the insulation jacket surrounding the insulation. The external temperature 104 during the night is lower because of lower ambient temperature of the environment and with no radiant heat from the sun. The external temperature 104 during the day is greater because of higher ambient temperature and with radiant heat from the sun. A pipeline with a PTD (unlike the insulated pipeline of FIG. 1) may capture heat transfer from the environment during the day to beneficially increase temperature (and thus lower viscosity) of the fluid flowing through the pipeline. The ambient temperature and sun radiant heat during the day may be greater in certain regions (e.g., Saudi Arabia) of the world.

A typical thermal insulation (e.g., FIG. 1) on a pipeline exhibits "no thermal flow" characteristics with respect to time of the day and external temperature. Therefore, the total thermal flow between the pipeline and the environment over a full day is zero (or close to 0). The insulation limits thermal outflow during the low temperature of the night and limits thermal inflow during the high temperature of the day. Unfortunately, with the presence of the thermal insulation radially surrounding the pipe, the insulated pipeline does not utilize external heat during the day to warm the fluid and decrease the fluid viscosity.

In absence of thermal insulation (FIG. 2), the thermal inflow profile has a different shape as little or no thermal resistance is opposed to heat flow. The fluid in the pipeline experiences cycle variation of thermal inflow, which may change viscosity of the fluid. The total thermal inflow is different than zero, which may alter the fluid viscosity.

FIG. 2 is a plot 200 of external temperature (° C.) 202 and thermal inflow (W/cm$^2$) 204 over time (hours) for a pipeline having no thermal insulation. The pipeline may be a pipeline in which the external or outer surface is bare or painted (or has a coating to resist corrosion) but no thermal insulation. The plot 200 is a thermal inflow profile of the pipeline on a diurnal (24-hours) temperature cycle. The thermal inflow 204 behavior generally mirrors the external temperature 202 because the pipeline has no insulation. The thermal inflow 204 is negative when the external temperature 202 is low. In other words, the thermal inflow 204 becomes a positive thermal outflow (heat transfer from pipeline to the environment) when the external temperature 202 is low. Thus, the temperature and viscosity of the pipeline fluid decreases at night when the external temperature 202 is low leading to more pump head (greater energy consumption) for conveying the pipeline fluid at night. The external temperature 202 may be the temperature of the external surface of the pipeline (e.g., bare pipeline). This external temperature 202 (surface temperature of the pipeline) may be due to ambient conditions including ambient temperature and sun radiant heat. The temperature 202 during the day may be greater because of higher ambient temperature and with radiant heat from the sun. The external temperature 202 during the night may be lower because of lower ambient temperature of the environment and with no radiant heat from the sun. A pipeline with a PTD (unlike the pipeline of FIG. 1) may reduce or prevent heat transfer from the pipeline to the environment during cool nights (e.g., when the external temperature 202 drops below a threshold) to beneficially maintain fluid temperature and viscosity in the pipeline. The ambient temperature may vary significantly between day and night in certain world regions, such as the Middle East and other regions.

FIG. 3 is a plot 300 of external temperature (° C.) 302 and thermal inflow (W/cm$^2$) 304 over time (hours) for a pipeline having an implementation of the present PTD. The plot 300 is a thermal inflow profile of the pipeline on a diurnal (24-hours) temperature cycle. The external temperature 302 may be the temperature (due to ambient conditions including ambient temperature and sun radiant heat) of the external surface of the PTD disposed on the pipeline. In certain instances, the external temperature 302 may be the temperature of an external graphene sheet that surrounds the PTD, as describe below.

The external temperature 302 during the night is lower because of lower ambient temperature of the environment and with no radiant heat from the sun. The external temperature 302 during the day is greater because of higher ambient temperature and with radiant heat from the sun.

The PTD provides for an insulation mode (insulation state) at night such as when the external temperature 302 is below a threshold. Therefore, the thermal inflow 304 is zero (not negative) in this example when the external temperature 302 is below the specified temperature threshold. Thus, unlike the pipeline of FIG. 2 having no thermal insulation, the temperature and viscosity of the pipeline fluid in this implementation does not decrease when the external temperature 302 is below the threshold (e.g., at night).

As for when the external temperature 302 is above the threshold (e.g., during the daylight), the PTD provides for a no-insulation mode (no-insulation state). Therefore, unlike the insulated pipeline of FIG. 1, the temperature and viscosity of the pipeline fluid in this implementation may increase during the day with heat transfer from the environment to the pipeline.

In all, the thermal inflow 304 may be a function of the insulation mode and no-insulation mode, as discussed below. With the present PTD, the pipeline (e.g., FIG. 3) may benefit of the combination of positive thermal inflow during the day and no thermal flow during the night. This combination may beneficially correspond to a total positive thermal inflow over one diurnal cycle.

The set-up of embodiments of the PTD may generally be based in part on the thermal expansion of a control material (e.g., PCM) in the PTD. Implementations employ what may be characterized as a contact switch with contact (or no contact) based on behavior of the control material to give the no-insulation mode or insulation mode.

Embodiments of the present techniques may: (1) allow or advance heat transfer from the environment to the transported fluid to increase the temperature of the transported fluid when the surrounding environment temperature is greater than a threshold temperature (e.g., deformation temperature of the control material); and (2) reduce or stop the heat transfer from the transported fluid to the environment when outside temperature falls below the threshold temperature. If the threshold temperature is deformation temperature (Tt) of the control material, this temperature Tt may approximate (e.g., within 5° C.) the desired temperature of the fluid in the pipeline. The control material may be a PCM. The Tt may be the temperature at which the PCM experiences a significant expansion (e.g., temperature of phase change or temperature of transition). See, e.g., FIG. 9.

In operation with certain implementations of the PTD (or PCM-PTD), the viscosity of the fluid in the pipeline decreases when outside temperature is greater than Tt. The fluid viscosity is maintained (or increases very slightly) when the environment is colder than Tt (e.g., during the night). Implementations include to increase thermal heat flow from outside to inside the pipeline and to reduce thermal heat flow from inside to outside the pipeline.

Figure 4:
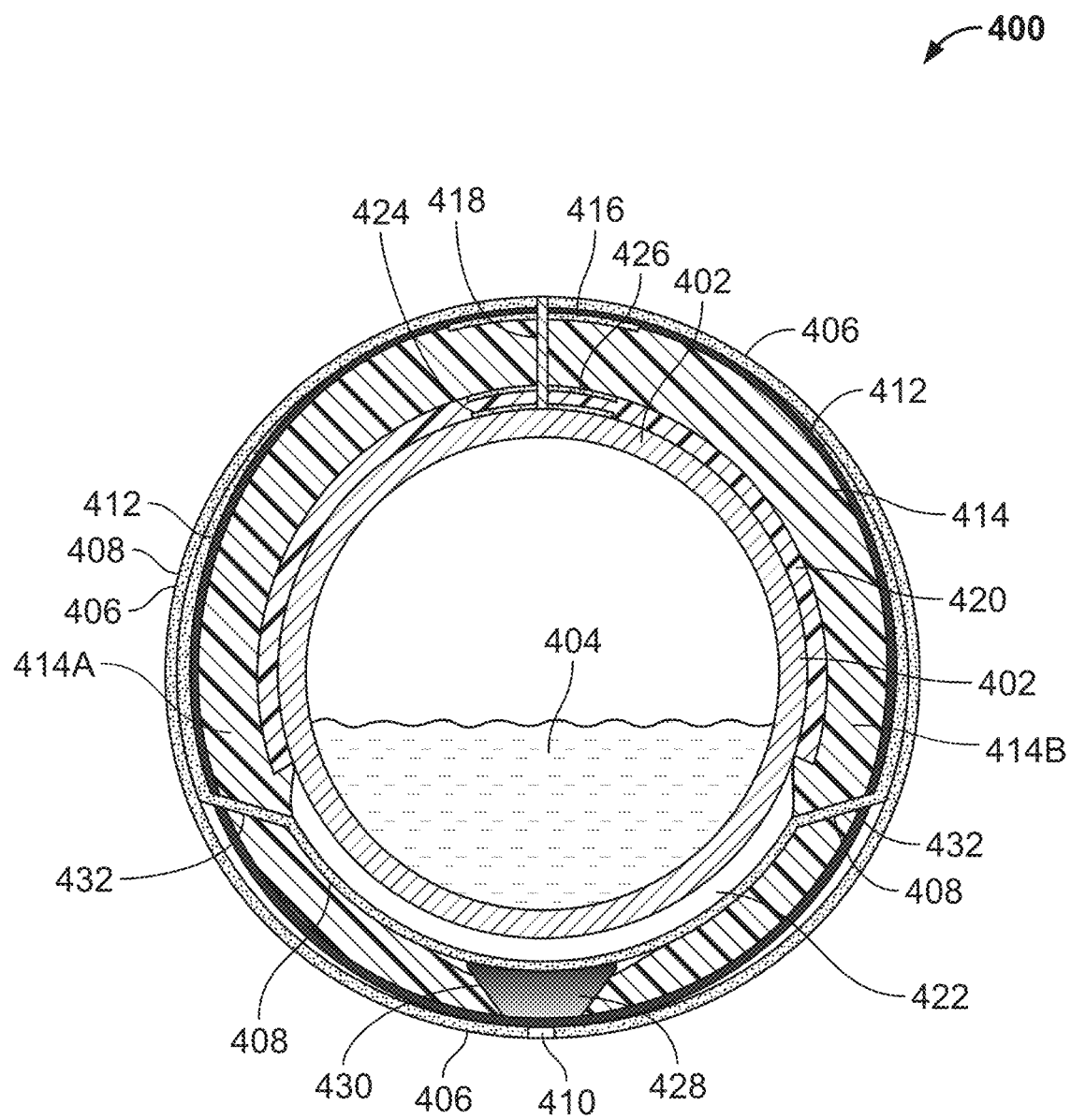
FIG. 4 is diagram of a process change material (PCM)-PTD installed on a pipeline.

FIG. 4 is an example of a PCM-PTD 400 installed on a pipeline 402. In this cross-sectional view, dots are utilized for the heat transfer layers 406, 408, solid black is utilized for the polymer shell 412, and cross-hatching utilized for the remaining layers. However, these symbols are for clarity and not meant to represent a property.

The pipeline 402 (or length of the pipeline 402) that receives the PCM-PTD 400 is generally above-ground (not a buried pipeline). The pipeline 402 is exposed to the sun. Transported fluid 404 is depicted in the pipeline 402. In this example, the pipeline 402 is steel pipe and has a wall thickness of about 12.5 millimeters (mm). The PCM-PTD 400 is applicable for pipelines of various diameters and wall thicknesses.

The PCM-PTD 400 employs a principle of a mechanical switch (also labeled as contact switch) having two positions decided by external temperature. In certain embodiments, one position (no-contact position or insulation position) of the switch corresponds with an internal graphene sheet (a thermal conductor) of the PCM-PTD 400 not in contact with the pipeline 402. The other position (contact position or no-insulation position) of the mechanical switch places the internal graphene sheet into contact with the pipeline 402.

The mechanical switch may be in the contact position (no-insulation position) in response to the external temperature being greater than Tt of the PCM. With the switch in the contact position, heat transfer occurs from the environment through the internal graphene sheet to the pipeline 402. The mechanical switch may be in the no-contact position (insulation position) in response to the external temperature being less than Tt of the PCM. With the switch in the no-contact position, no heat transfer occurs through the internal graphene sheet between the environment and the pipeline 402.

As discussed below, the functioning of the mechanical switch may be driven by a combination of (1) thermal expansion of a control material (e.g., PCM) in the PCM-PTD 400 and (2) two polymer layers of the PCM-PTD 400 having dissimilar thermal expansion coefficients.

The PCM-PTD 400 has heat-transfer material layers 406, 408 which may be flexible (not rigid). An external heat transfer layer 406 (hereinafter external graphene sheet 406) and an internal heat transfer layer 408 (hereinafter internal graphene sheet 408). See, e.g., FIGS. 10-11. While the discussion herein may focus on the heat transfer layers as graphene, other materials (e.g., carbon nanotubes) are applicable for the heat transfer layers.

In operation, movement of the internal graphene sheet 408 may affect heat transfer between the pipeline 402 and the environment. For instance, with the internal graphene sheet 408 not in contact with the pipeline 402, as depicted in FIG. 4, the internal graphene sheet 408 does not act a thermal conduit for heat transfer between the environment and the pipeline 402. Such positioning (no contact with the pipeline 402) of the internal graphene sheet 408 may be beneficial when the external temperature is low (e.g., at night). Heat is not loss from the pipeline 402 through the internal graphene sheet 408 to the environment. Thus, the temperature of the transported fluid 404 may be generally maintained (not decrease or not decrease significantly) to avoid viscosity increase. The insulation material layer 420 and the air gap 422 may thermally insulate the pipeline 402.

When the internal graphene sheet 408 moves into contact with the pipeline 402 (e.g., FIG. 8), heat transfer occurs through the internal graphene sheet 408 from the environment and the pipeline 402. Such may be advantageous when the external temperature is high (e.g., during the day). Heat transfer occurs from the environment to the pipeline 402 to beneficially increase temperature of the transported fluid 404 to decrease viscosity of the transported fluid 404. Graphene material has a relatively high thermal conductivity. The heat transfer through the internal graphene sheet 408 bypasses the insulation material layer 420 and the air gap 422.

The external graphene sheet 406 resides on the exterior of the PCM-PTD 400 around the circumference of the PCM-PTD 400. The external graphene sheet 406 may have a coupling arrangement 410 (e.g., including eyelets or grommets) to affix the two ends of the external graphene sheet 406 to each other. See, e.g., FIG. 10. The internal graphene sheet 408 is disposed (resides) under (adjacent) a length of the external graphene sheet 406 and also extends into the interior of the lower portion of the PCM-PTD 400. During assembly, a portion of the internal graphene sheet 408 may be inserted into the PCM-PTD 400.

While the graphene sheet 408 is labeled as an "internal" graphene sheet, a portion of the internal graphene sheet 408 is on the exterior of the polymer shell 412 underneath and in contact with the external graphene sheet 408. This portion (outside portion) of the internal graphene sheet 408 being in contact with the external graphene sheet 406 may provide for thermal coupling of the internal graphene sheet 408.

The PCM-PTD 400 has a polymer shell 412 (an outer polymer layer) and an inner polymer layer 414 that have dissimilar thermal expansion coefficients. The inner polymer layer 414 will generally have a greater thermal expansion coefficient than the polymer shell 412 so that more expansion occurs to the inside of the polymer shell 412. The polymer shell 412 and the inner polymer layer 414 may be bonded (via bond 416) to each other at an upper portion of the PCM-PTD 400. In operation of the PCM-PTD 400, there may be movement of the inner polymer layer 414 with respect to the polymer shell 412, such as at the middle or lower portions of the PCM-PTD 400. The contact between the polymer shell 412 and the inner polymer layer 414 may be low-friction contact. For example, the inner polymer layer 414 may be coated with a relatively thin layer of polytetrafluoroethylene (PTFE).

The polymer shell 412 may be, for example, an epoxy. The epoxy may be a cured (crosslinked) epoxy resin having epoxide groups. The epoxy may be a thermoset polyepoxide polymer. The polymer shell 412 may have a thickness, for example, in a range of 2 mm to 6 mm, or at least 4 mm.

The inner polymer layer 414 may be, for example, polyethylene terephthalate (PET). The inner polymer layer 414 may have a thickness, for example, in a range of 10 mm to 30 mm (or 15 mm to 25 mm), or at least 20 mm.

The inner polymer layer 414 may be two sections or blocks 414A and 414B that mate or interface at the assembly system 418 (an assembly arrangement) at a top portion of the PCM-PTD 400. The assembly system 418 (e.g., FIG. 5) facilitates mounting of the PCM-PTD 400 onto the pipeline 402 and may give an anchor point (or anchor length or anchor region) for moving parts of the PCM-PTD 400.

The inner polymer-layer blocks 414A, 414B that interface at the assembly system 418 may be a left section and right section, respectively, of the inner polymer layer 414. A cavity between the blocks 414A, 414B at a bottom portion of the PCM-PTD 400 may be a cavity for a control material to reside. The control material may be a material having a thermal expansion coefficient greater than 2.0e-4 $K^{-1}$. The control material may be a PCM or PCM bag 428.

The PCM-PTD 400 has an insulation material layer 420 (hereinafter insulation layer 420) in an upper portion of the PCM-PTD 400 and an air gap 422 as an insulation layer in a bottom portion of the PCM-PTD 400. The insulation layer 420 is bonded (via the bond 424) to an upper portion of the outer surface of the pipeline 402. The insulation layer 420 may be optionally additionally bonded (via optional bond 426) to the inner polymer layer 414 at an upper portion of the PCM-PTD 400. In embodiments, the bond 426 is not implemented do to facilitate subsequent maintenance of the PCM-PTD 400. The bonds 416 and 424 (and 426 if employed) may be, for example, an epoxy glue that withstands the mechanical and temperature performance. For the PCM-PTD 400 working at greater temperatures, 416 and 424 (and 426 if employed) may be, for example, a silicone-based glue or a sodium silicate glue.

In operation of the PCM-PTD 400, there may be movement of the inner polymer layer 414 with respect to the insulation layer 420, such as at the middle or lower portions of the PCM-PTD 400. The contact between the insulation layer 420 and the inner polymer layer 414 may be relatively low-friction contact. As mentioned, the inner polymer layer 414 may be coated, for example, with PTFE.

The insulation layer 420 may have a thermal conductivity coefficient, for example, in a range of 0.01-0.05 watts per meter-kelvin (W/(m·K). The insulation layer 420 may be, for instance, polyurethane (PU) (e.g., polyurethane foam) or a phenolic material (e.g., phenolic foam). The thickness of the insulation layer 420 may be, for example, in the range of 5 mm to 25 mm, or at least 10 mm. In operation, the insulation layer 420 may prevent or reduce thermal leaks from the pipeline 402 through the polymer blocks 414A, 414B. The bottom portion of the PCM-PTD 400 may not employ an insulation layer material because insulation is provided via the air gap 422.

In the illustrated embodiment, the PCM-PTD 400 includes a PCM bag 428, which is PCM inside a bag. The bag may be a flexible container, pouch, containment bag, barrier bag, etc. The bag can be, for example, an elastomer material. Employment of the PCM as housed in a bag may be for convenience (ease-of-installation) and containment of the PCM. In some implementations without a bag, the PCM might adsorb onto the internal graphene layer 408, or infiltrate between the inner polymer layer 414 and the internal graphene layer 408 or polymer shell 412. The bag contains the PCM in solid and liquid forms. Without the bag, the PCM in liquid form might not remain in place in the cavity in which the PCM bag 428 resides.

In operation, the PCM bag 428 (including the PCM and the bag) expands and contracts. The greatest rates of expansion and contraction of the PCM bag 428 may be during phase transition of the PCM in the bag. The rate of expansion may be greatest when the PCM in the bag 428 is changing from solid to liquid. The rate of expansion may continue to be relatively high with the PCM as a liquid and as the temperature further increases above the phase transition temperatures. The rate of contraction may be greatest when the PCM in the bag 428 is changing from liquid to solid. The contact 430 between the PCM bag 428 and the inner polymer-layer blocks 414A, 414B may be characterized as a sliding contact.

Cavities 432 (paths, holes, cylindrical holes, etc.) on each side of the PCM-PTD 400 receive the internal graphene sheet 408 (e.g., a graphene web). Thus, the internal graphene sheet 408 reaches (accesses or interfaces) the PCM bag 428 and air gap 422 so that the internal graphene sheet 408 may be placed into engagement (contact) with the bottom portion of the pipeline 402. The cavities 432 may be sized relatively small so not to decrease structural integrity of the PCM-PTD 400. For installation of the internal graphene sheet 408, a leading portion of the internal graphene sheet 408 (e.g., graphene web) may be folded in order to be inserted (or fit) with and through the cavities 432.

Figure 5:
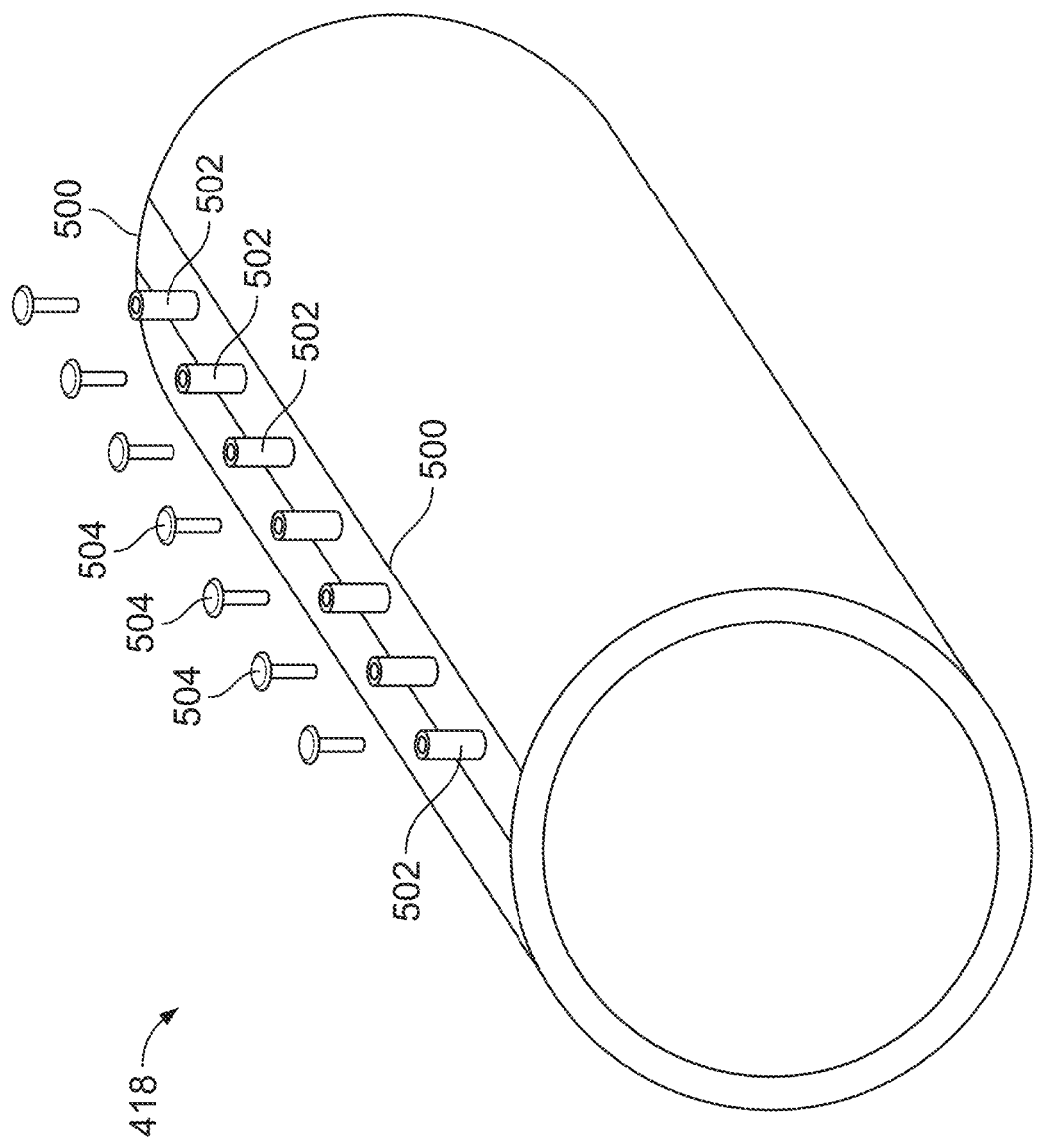
FIG. 5 is a perspective view of an example of the assembly system on the pipeline that may be employed to anchor the PCM-PTD.

FIG. 5 is an example of the assembly system 418 on the pipeline 402 and that may be employed to anchor the PCM-PTD 400. The assembly system 418 may be characterized as an anchor, anchor point, or anchoring system. Prior to installing the bulk of the PCM-PTD 400 on the pipeline 402, the assembly system 418 having a base 500 (relatively flat plate) and coupling elements 502 may be installed on the pipeline 502. The base 500 may be, for instance, glued (e.g., with epoxy) or welded to the pipeline 402. The base 500 supports the coupling elements 502. The coupling elements 502 may be affixed to the base 500. In some implementations, the coupling elements 502 (e.g., threaded plugs) and the base 500 (plate) may be formed (extruded) together as a single component. The extruded material forming the component may be, for example, metal oxide (e.g. ceramic) or polymer such as polypropylene (PP) or high density polyethylene (HDPE).

Figure 6:
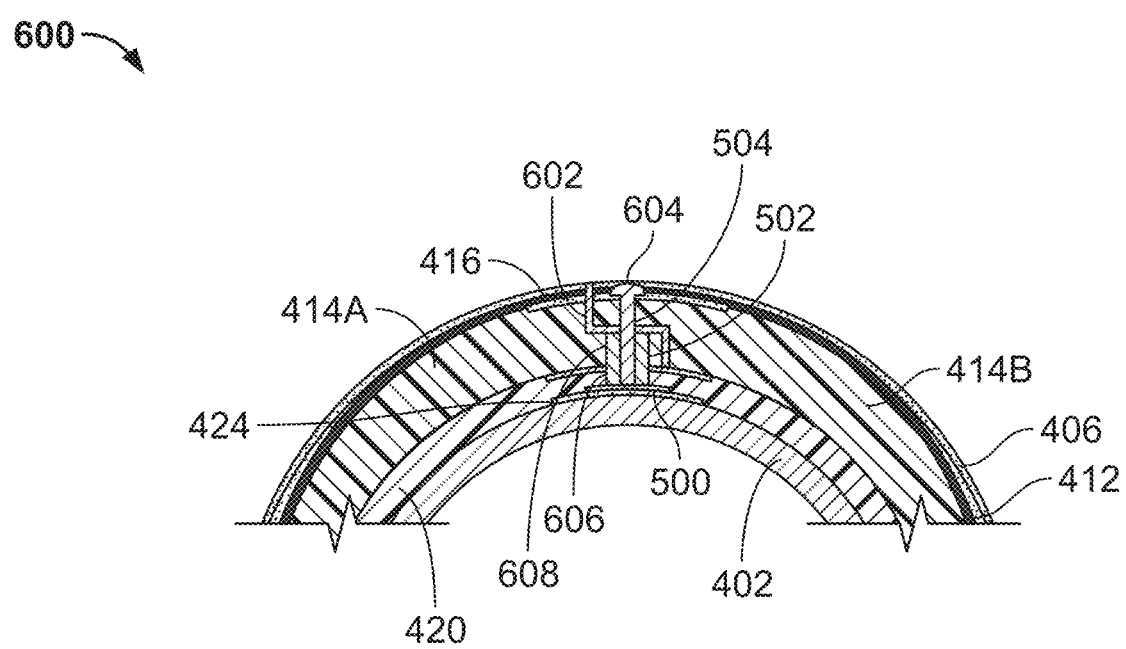
FIG. 6 is a diagram of an upper portion of the PCM-PTD as installed on the pipeline.
Figure 7:
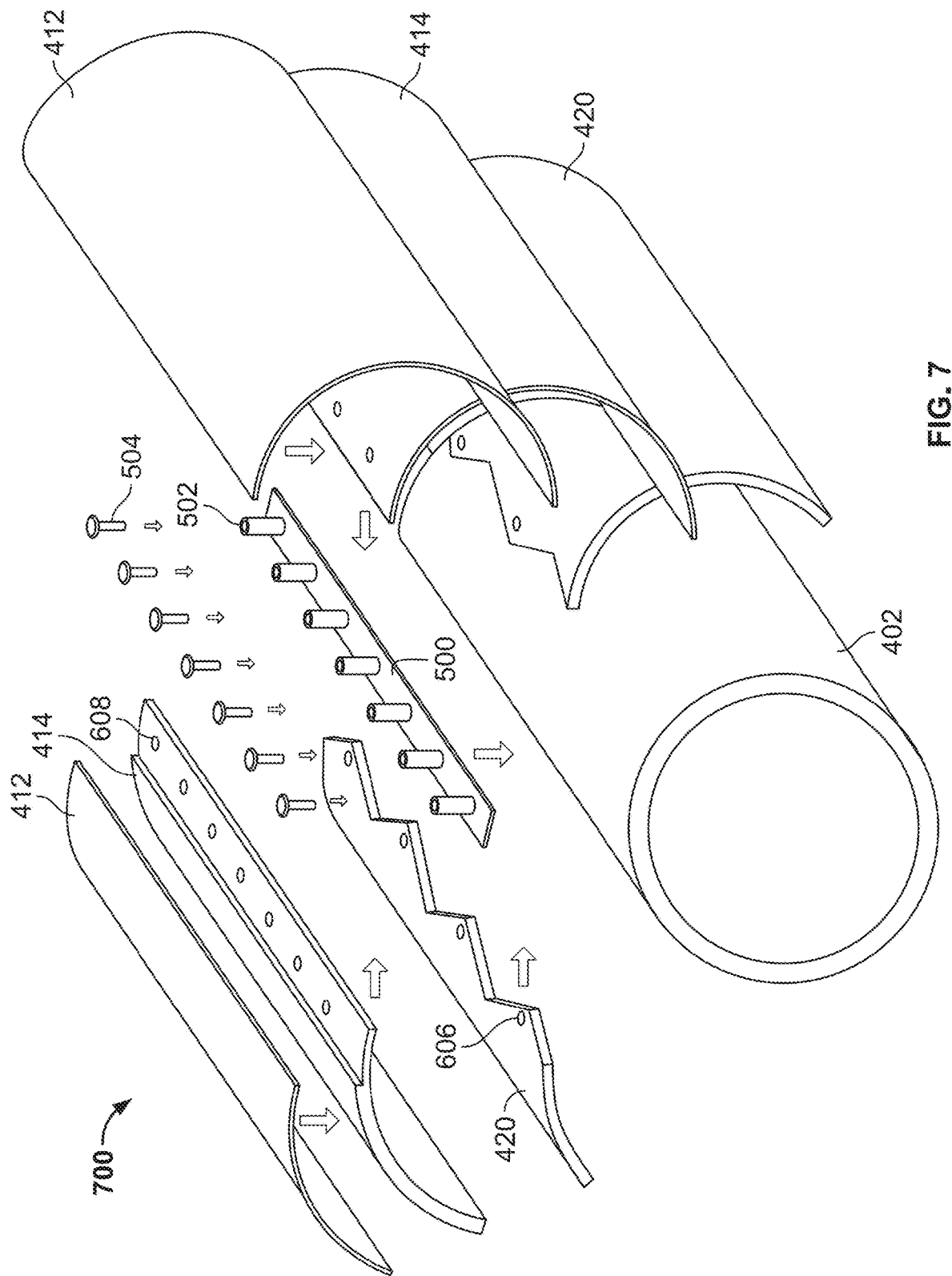
FIG. 7 is an example assembly drawing of the PCM-PTD.

The assembling system 418 also includes coupling elements 504 that mate with the coupling elements 502 to secure the assembly of the PCM-PTD 400 (see, e.g., FIGS. 6-7). The base 500 and mating coupling elements 502, 504 may be polymer, ceramic, or metal. In the illustrated example, the coupling elements 504 are male coupling elements and the coupling elements 502 are female coupling elements. The male coupling elements 504 (e.g., threaded male pins) are inserted into the female coupling elements 502 (e.g., threaded female pins or plugs) during the assembly of the PCM-PTD 400.

FIG. 6 is an upper portion 600 of the PCM-PTD 400 as installed on the pipeline 402. As discussed, the depicted assembly system 418 includes female coupling elements 502 affixed to the base 500. The bonding of the base 500 (e.g., plate) of the assembly system 418 with the pipeline 402 may be incorporated in the bond 424 between the insulation layer 420 and the pipeline 402.

For installation, the PCM-PTD 400 is wrapped around the pipeline 402 (e.g., from the bottom of the pipeline 402 closing at the top portion of the pipeline 402) and secured with the pipeline 402 via the assembly system 418 (e.g., fixation system) described with respect to FIGS. 5-7. The two blocks 414A, 414B that compose the inside polymer layer 414 meet to form an interface 602 having a zig-zag shape and that may be characterized as a cut.

As for the assembly system 418, the male coupling element 504 is depicted inserted into the female coupling element 502 mounted on the base 500. The coupling elements 502, 504 may have mating threads. In the illustrated example, the male coupling element 504 has a head 604 to further secure the assembly system 418. The external graphene sheet 406 may reside under the head 604. In alternate embodiments, the external graphene sheet 406 may reside on top of the head 604.

The insulation layer 420 has holes 606 (see also FIG. 7) to accommodate the female coupling elements 502. The inner polymer layer 414 has holes 608 to accommodate the female coupling elements 502 and the male coupling elements 504. The holes 608 may extend through the polymer shell 412.

FIG. 7 is an example assembly drawing 700 of the PCM-PTD 400. At 1, the polymer shell 412 is glued (bonded) to the inner polymer layer 414. At 2, the base 500 (plate, carrier) having the mounted female pins 502 is glued or welded, or otherwise fixed, onto the pipeline 402. At 3, the insulation layer 420 is placed onto the pipeline 402. The insulating layer 420 has holes 606 (e.g., cylindrical holes) to fit over the female pins 502 of the assembly system 418. The female pins 502 are inserted through the holes 606 of the insulating layer 420. At 4, the inner polymer layer 414 (with the polymer shell 412) is placed onto the insulating layer 420. The female pins 502 of the assembly system 518 inserted through holes 608 (e.g., cylindrical holes) of the inner polymer layer 414 and polymer shell 412.

The external graphene sheet 406 may be placed around the PCM-PTD 400 (with the assembly system) and secured, for example, via eyelets (on respective ends of the graphene sheet 406) at a bottom portion of the PCM-PTD 400 and pipeline 402. For the external graphene sheet 406 to reside under the heads 604 (FIG. 6), holes may be formed in the graphene sheet 406 for receipt of the coupling elements 502, 504.

At 5, the PCM-PTD 400 is locked (secured) in place via insertion of the male pins 504 into the female pins 502 to couple the male pins 504 with the female pins 502. In some implementations, the pins 502, 504 have mating threads.

Figure 8:
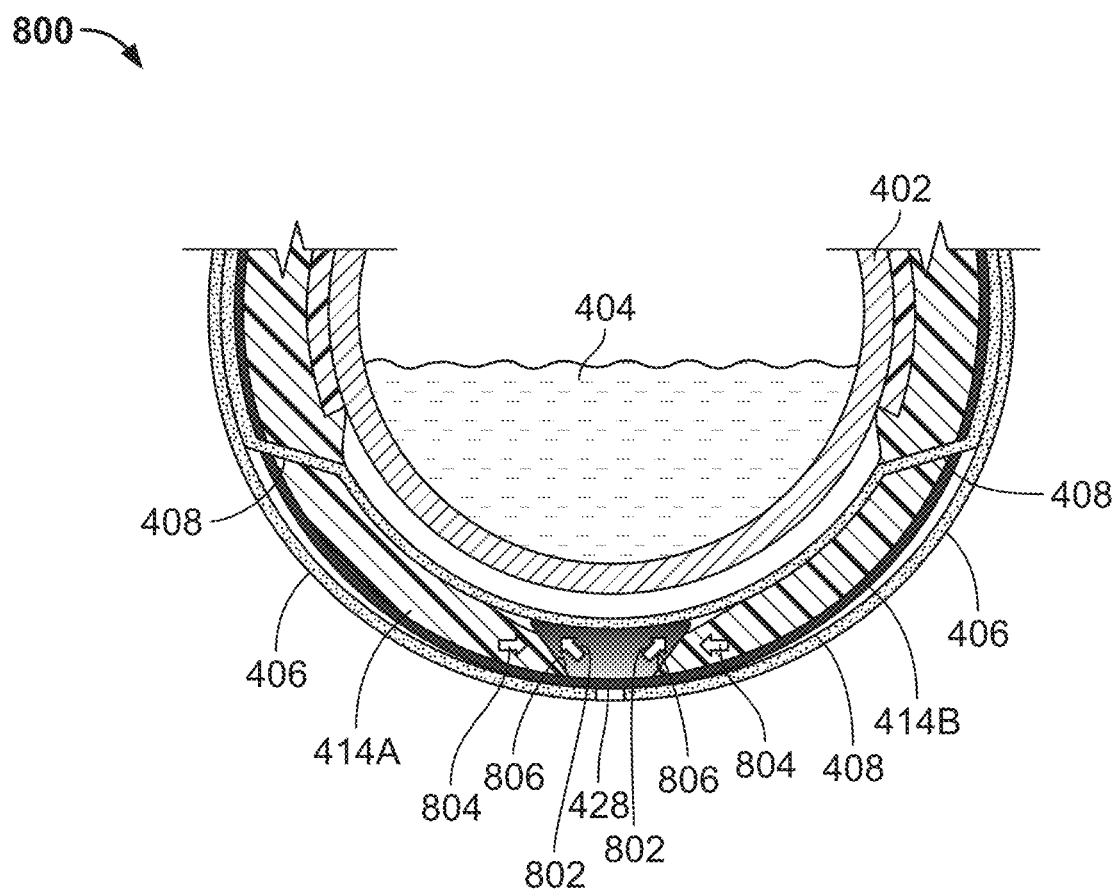
FIG. 8 is a diagram of a lower portion of the PCM-PTD disposed on the pipeline.

FIG. 8 is a lower portion 800 of the PCM-PTD 400 disposed on the pipeline 402. The depicted state of the PCM-PTD 400 is with the internal graphene sheet 408 in contact with the pipeline 402 so that heat transfer may occur through the internal graphene sheet 408 between the environment and the pipeline 402. Heat transfer from the environment to the pipeline 402 is desired to heat the transported fluid 404 and thus lower the viscosity of the fluid 404. The operational state of the PCM-PTD 400 depicted in FIG. 8 may be driven by the external temperature exceeding a threshold temperature. The threshold temperature may be Tt of the PCM in the PCM bag 428.

The external temperature may be measured by temperature sensor(s) exterior to the PCM-PTD 400 and pipeline 402 in the environment surrounding the PCM-PTD 400 and pipeline 402. In implementations, temperature sensor(s) for measuring external temperature may reside on or be thermally coupled to the exterior surface of the PCM-PTD 400. In those implementations, the external temperature may be the surface temperature of the exterior (outside) surface of the PCM-PTD 400. The exterior surface of the PCM-PTD 400 may be the exterior surface of the external graphene sheet 406.

For heat transfer from the environment to the pipeline 402 (when the external temperature is high), at least two aspects of the PCM-PTD 400 structure and operation give an upward movement of the PCT bag 428 to push the internal graphene sheet 408 into contact with the pipeline 402: (1) thermal expansion of the PCM bag 428 as indicated by arrows 802; and (2) the inner-polymer layer blocks 414A, 414B freely expanding in the circumferential direction to trigger or apply a compression (as indicated by arrows 804) between the respective lower ends 806 of the blocks 414A, 414B. Structural features that may facilitate this operation include the bonding (bond 424) of the insulation layer 420 with the pipeline 402 and also the coating of the inner polymer layer 414 with a low-friction material (e.g., PTFE)

to give a low-friction contact of the inner polymer layer 414 with respect to the insulation layer 420, polymer shell 412, and the PCM bag 428.

Figure 9:
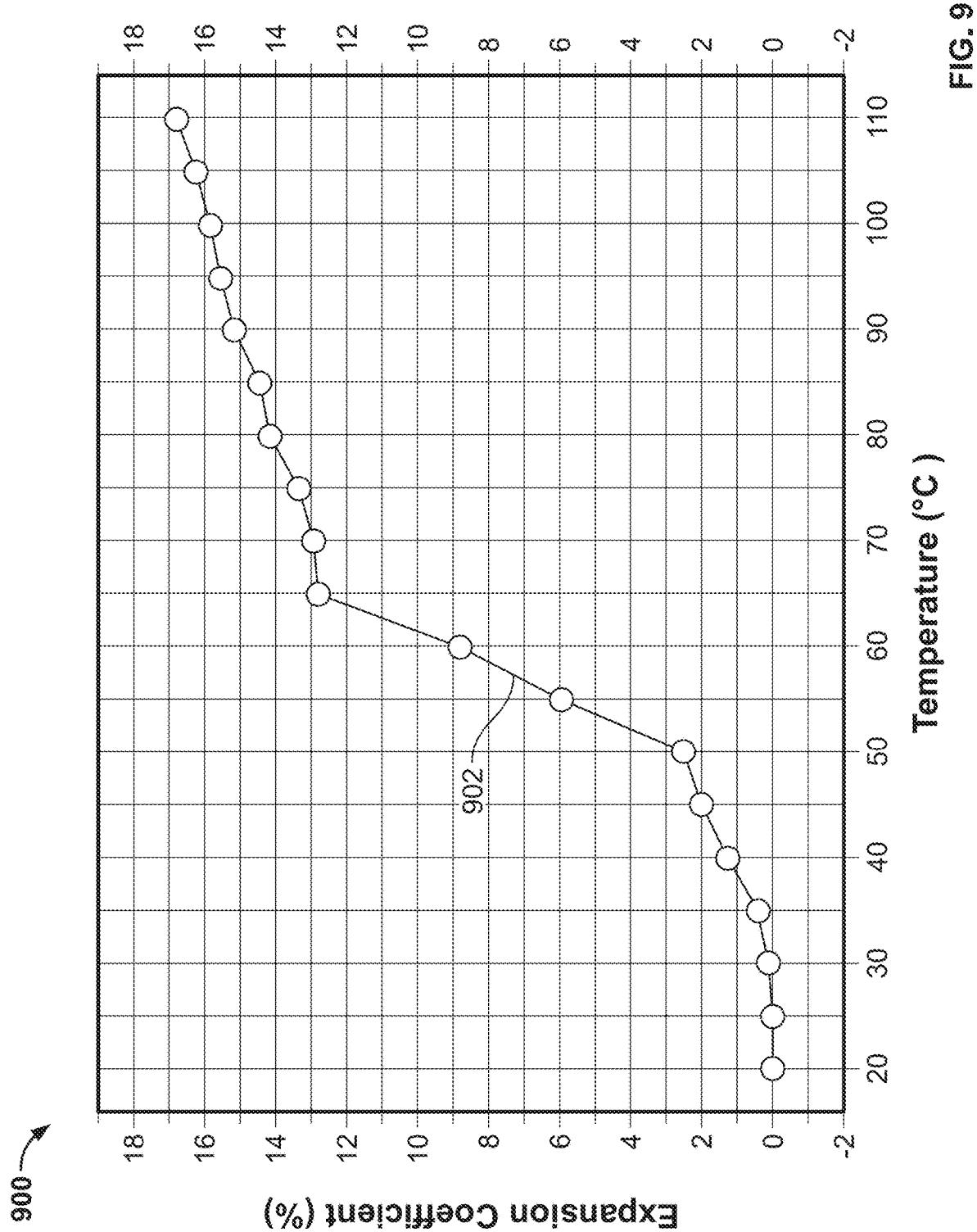
FIG. 9 is a plot of expansion coefficient versus temperature for a paraffin material as example of the phase change material (PCM) in the PCM bag.

FIG. 9 is a plot 900 of expansion coefficient (%) versus temperature (° C.) for a paraffin material (paraffin wax or paraffin waxes) as example of the phase change material (PCM) in the PCM bag 428. This expansion coefficient (%) is the volume expansion in percent in response to temperature. There are three areas or regions for behavior of the paraffin material as indicated in the plot 900: (1) solid phase with little expansion; (2) paraffin waxes are melting (temperature of deformation); and (3) liquid phase with greater expansion than the solid phase. In this example, the PCM is a solid below 50° C. and a liquid above 65° C. The PCM experiences phase transition (between solid and liquid) in the temperature range from 50° C. to 65° C. As indicated by the curve 902, the greatest rates of expansion and contraction of the PCM are in this temperature range during the phase transition and also with significant rates of expansion with increase temperature (above 65° C.) in the liquid phase. In the temperature range 50° C. to 65° C. and associated phase transition, the PCM undergoes what can be labeled as a deformation. Therefore, the Tt of this PCM may be assigned, for instance, as 55° C. or 60° C. As discussed, Tt may be a temperature at which the PCM experiences a significant expansion (e.g., temperature of phase change or temperature of transition).

Thus, in application, when the external temperature exceeds this threshold, the PCM bag 428 (FIG. 8) may expand (802) adequately so that the internal graphene layer 408 engages the pipeline 402. In addition, the exerted compression (804) of the inner polymer layer 414 (also due to thermal expansion) may further the upward movement of the PCM bag 428 to additionally promote that the internal graphene sheet 408 engages (contacts) the pipeline 402. As discussed, the inner polymer layer 414 may be specified with higher coefficient of thermal expansion as compared to the polymer shell 412.

The control material (in the bag 428 or without the bag 428 but residing in the cavity for the bag) can be a material that does not change phase in the relevant temperature range. Instead, the control material can be specified with a thermal expansion coefficient (e.g., at least 0.0002 $K^{-1}$) to adequately provide for thermal expansion of the control material without phase change. Examples of such control material include ethylene methyl acrylate (EMA), ethylene butylene butyl acrylate (EBA), ethylene ethyl acrylate (EEA), Arnitel® EM400 available from Koninklijke DSM N.V. (known as DSM Company or DSM Engineering Plastics and having headquarters in the Heerlen, The Netherlands), and Hytrel® 4053FG or Hytrel® 4068 TPC available from DuPont de Nemours, Inc. (known as DuPont™ and having headquarters in Wilmington, Del., USA). However, certain PCMs (e.g., paraffin wax) provide for behavior (including with respect to thermal expansion coefficients) that may give greater displacement of the internal graphene sheet 408 during temperature variations. Moreover, the phase change may advance the PCM bag 428 to deform freely, whereas utilizing a solid control material with no phase change and no bag may mean sliding contact (and thus friction) between the control material and the inner polymer layer 414. The induced friction should generally instead be small or negligible so to not hinder displacements. The reduction of the friction between the inner polymer layer 414 and a control material (that is not a PCM bag) may be feasible utilizing low-friction coefficients polymers (e.g., PTFE) as a coating on the polymer layer 414 but such may not guarantee robustness of interaction with the control material because contaminants (e.g., sand or dust) can compromise the low friction coefficient.

Figure 10:
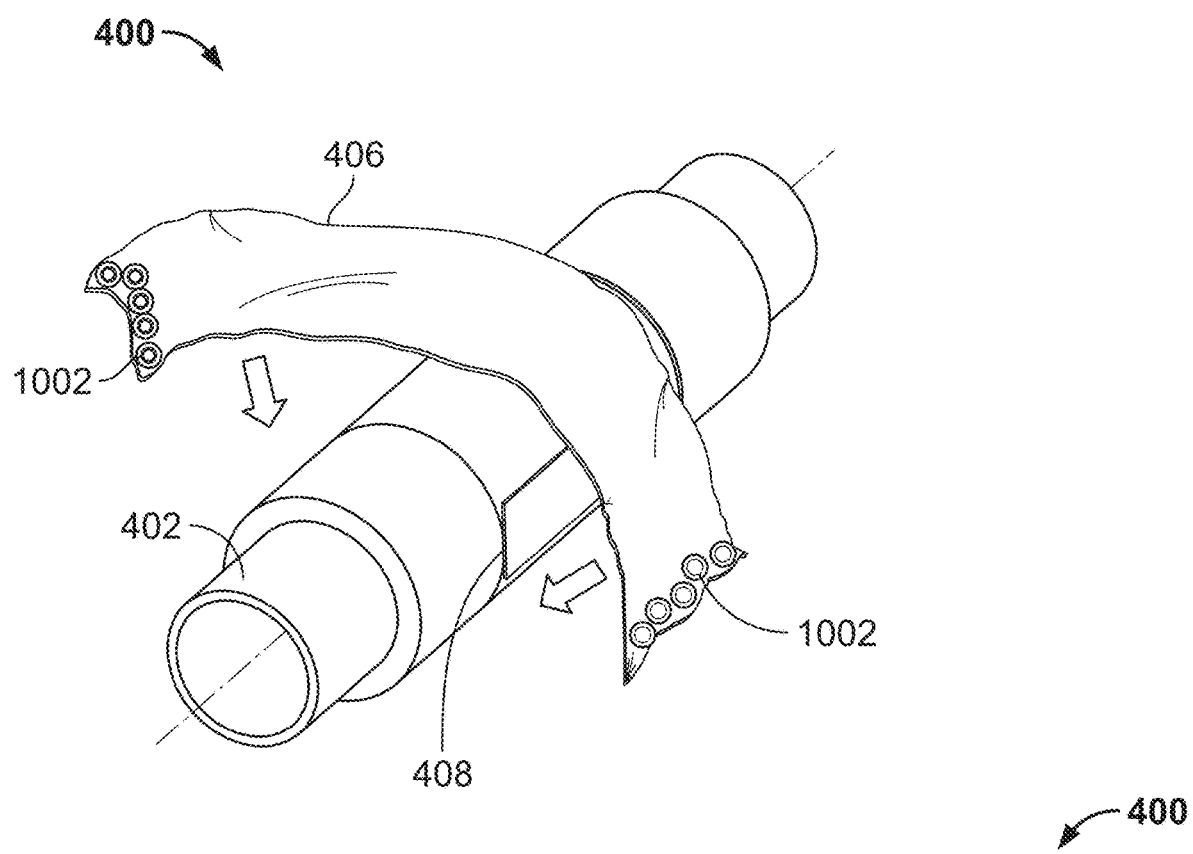
FIG. 10 is a perspective view of the PCM-PTD disposed on the pipeline and with depiction of the external graphene sheet being wrapped around the PCM-PTD as the exterior component of the PCM-PTD.
Figure 11:
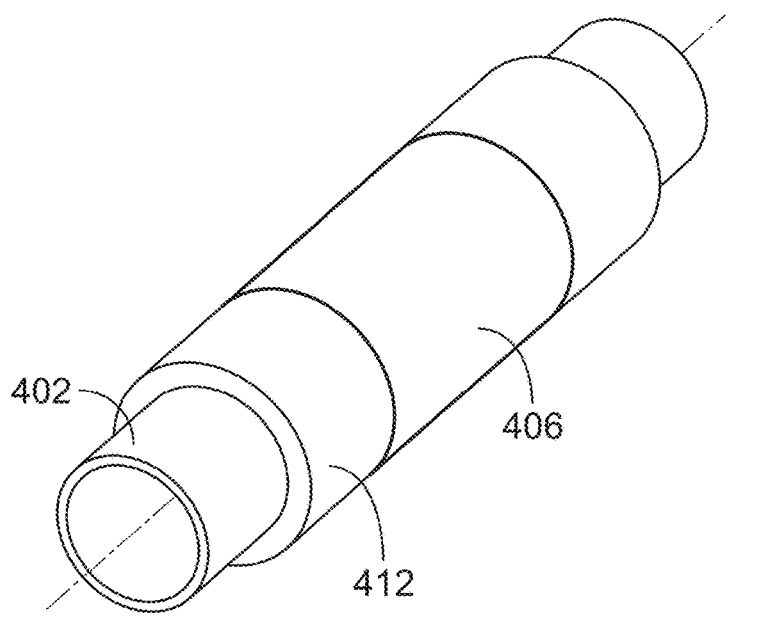
FIG. 11 is a perspective view of the PCM-PTD disposed and secured onto the pipeline.

FIG. 10 is the PCM-PTD 400 disposed on the pipeline 402 and with depiction of the external graphene sheet 406 being wrapped around the PCM-PTD 400 as the exterior component of the PCM-PTD 400. Graphene may be a thermal antenna of the PCM-PTD 400 system and therefore advance operation of the PCM-PTD 400. The external graphene sheet 406 may have a coupling arrangement 410 including eyelets 1002 (grommets) to affix the two ends of the external graphene sheet 406 to each other. The coupling arrangement 410 includes an additional coupling element (e.g., rings, studs, clips, wire, cable, etc.) to insert into mating eyelets 1002 to secure the two ends of graphene sheet 406 to each other (and thus secure the external graphene sheet 406 as the external component of the PCM-PTD 400 as indicated in FIG. 11). In fabrication of the external graphene sheet 406, the eyelets 1002 may be a ring or edge strip inserted or installed into holes formed at the end portions of the external graphene sheet 406. The eyelets 1002 can be circular, oval, rectangular, or irregular in shape. A circular shape may be beneficial with respect to distributing stress of the coupling. In some implementations, the eyelets 1002 may be generally flared or collared on each side to maintain the eyelets 1002 in place in the graphene sheet 406. The eyelets 1002 may be made of metal, plastic, or rubber.

In FIG. 10, the internal graphene sheet 408 is depicted as installed. The inside portion of the internal graphene sheet 408 inserted into the PCM-PTD 400 is not viewable in this perspective view. As discussed with respect to FIG. 4, this inside portion (not shown in FIG. 10) of the internal graphene sheet 408 is inserted through cavities 432 into contact with the polymer bag 428 between the polymer bag 428 and the bottom of the pipeline 402.

In contrast, the outside portion of the internal graphene sheet 408, which is shown in FIG. 10, resides under (and to be in contact with) the external graphene sheet 406. The contact of this outside portion of the internal graphene sheet 408 with the external graphene sheet 406 thermally couples the internal graphene sheet 408 with the external graphene sheet 406. Therefore, heat from the environment captured by the external graphene sheet 406 may flow through the internal graphene sheet 408 into the PCM-PTD 400. The heat may flow through the internal graphene sheet 408 to the pipeline 402 when the internal graphene sheet 408 is operatively pushed into contact with the pipeline 402. This heat transfer from the environment to the pipeline 402 may increase temperature of fluid 404 transported in the pipeline and thus decrease viscosity of the transported fluid 404.

FIG. 11 is the PCM-PTD 400 disposed and secured onto the pipeline 402. The external graphene sheet 406 is installed wrapped around as an exterior component of the PCM-PTD 400. The external graphene sheet 406 may reside around the circumference of the PCM-PTD 400 and generally cover the outside of the PCM-PTD in the longitudinal direction. As discussed with respect to FIG. 10, the external graphene sheet 406 (e.g., graphene web) is positioned around the exterior of the PCM-PTD 400. The two ends of the external graphene sheet 406 may have eyelets 1002. These eyelets 1002 are utilized in combination, for example, with a plastic or metallic cable to fix the external graphene sheet 406 after the sheet 406 has been wrapped around the PCM-PTD 400.

In FIG. 11, the external graphene sheet 406 is secured. Contact of the external graphene sheet 406 with the underlying internal graphene sheet 408 is established. Therefore, the combination of the graphene sheets 406, 408 is ready for heat transfer. When external temperature and sun irradiation are high, the graphene sheets 406, 408 may provide at least two advantages: (1) the conduction of thermal flow of heat captured to the pipeline with little or negligible energy loss due to the high thermal conductivity of graphene; and (2) increasing the surface temperature and therefore increasing the thermal flow transferred to the pipeline 402 due to the color black as the natural color of graphene helping the graphene sheet 408 to capture sun radiations (radiant heat). There may generally not be a need to glue the graphene sheets 406, 408 (e.g., graphene canvas) onto the polymer shell 412. The graphene sheets 406, 408 are in contact via the outside portion of the internal graphene sheet on the left and right sides of the PCM-PTD 400 in order for the thermal flow to access the inside of the PCM-PTD 400.

Figure 12:
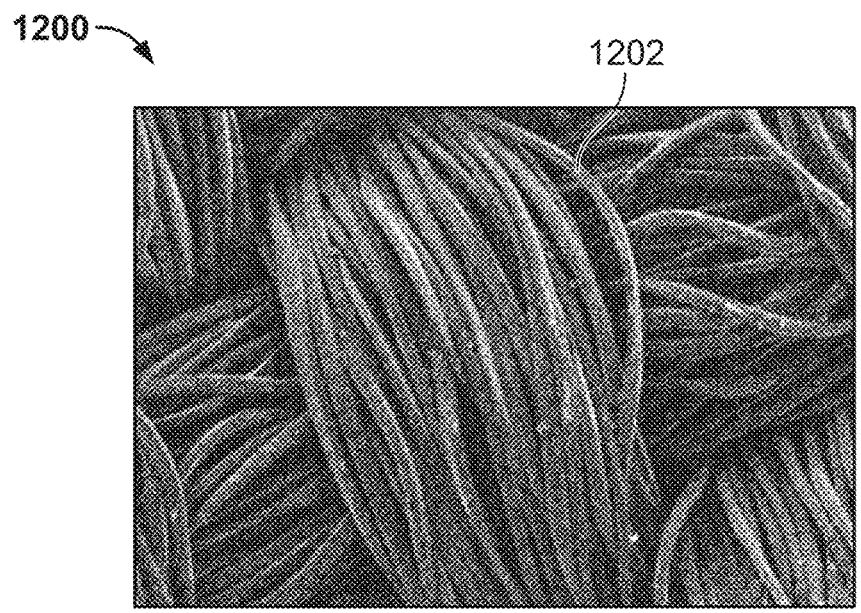
FIG. 12 is an image of a graphene web that may represent the material of the external graphene sheet or the internal graphene sheet, or both.

FIG. 12 is a graphene web 1200 that may represent the material of the external graphene sheet 406 or the internal graphene sheet 408, or both. To form the graphene web 1200, multiple graphene fibers 1202 may be bundled into a single graphene string. Then, multiple graphene strings may be weaved to form a sheet.

Figure 13:
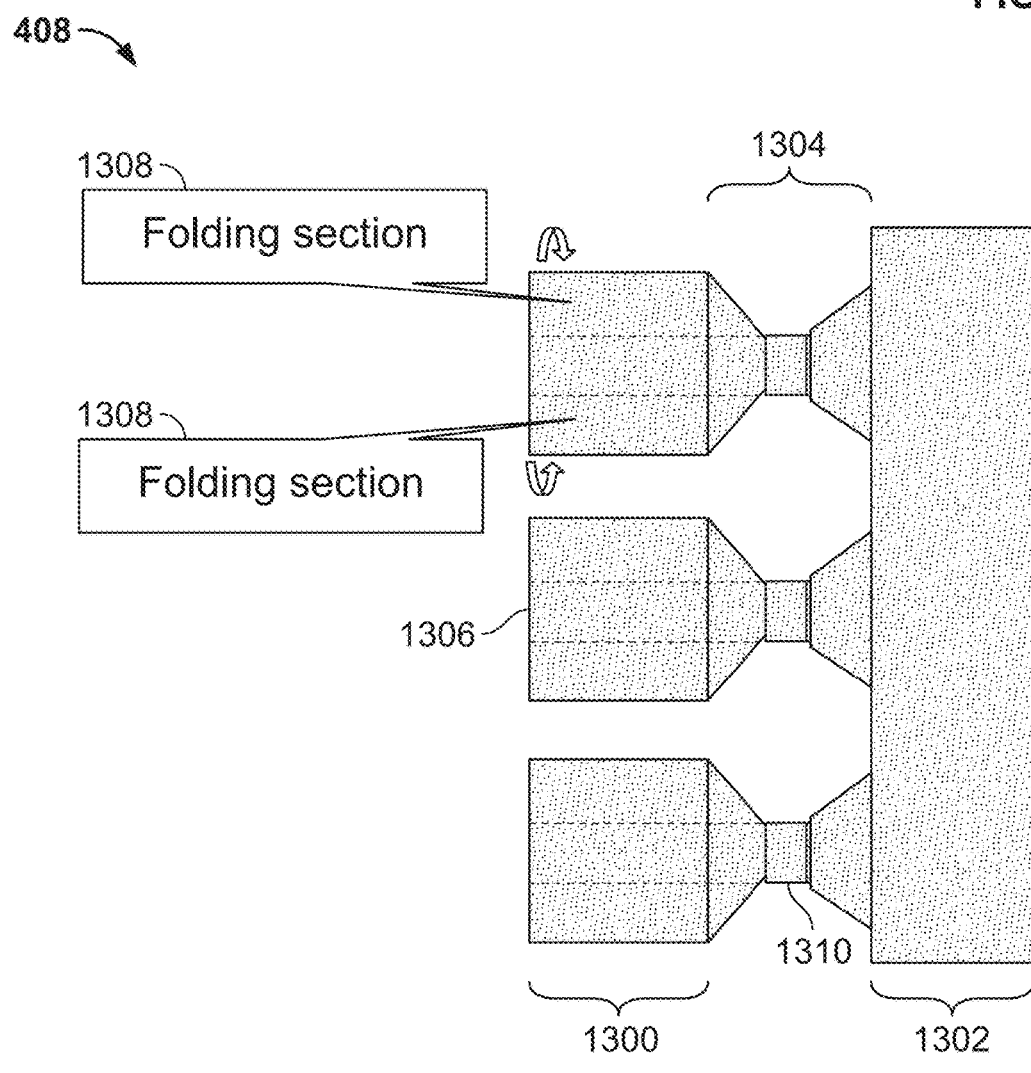

FIG. 13 is the internal graphene sheet 408 including the inside portion 1302, the outside portion 1300, and an intermediate short portion 1304 there between. The outside portion 1300 includes multiple extensions 1306 each having folding sections 1308. The intermediate short portion 1304 has multiple narrowed segments 1310 corresponding to the multiple extensions 1306.

For installation, the folding sections 1308 are folded and the multiple extensions 1306 inserted respectively through the cavities 432 (FIG. 4) of PCM-PTD 400. The multiple narrowed segments 1310 reside respectively in the cavities 432 (holes).

EXAMPLE

The principles of the PCM thermal expansion and the leverage on the differential of thermal expansion between two polymers to form a mechanical switch, controlled by the temperature, are evaluated. In this Example, the two polymers selected were PET (inner polymer layer) and epoxy (polymer shell) as they exhibit very dissimilar thermal expansion coefficients (Table 1). Other combinations of polymers are applicable. The evaluation in this Example was performed by computational analysis of a PCM-PTD analogous to PCM-PTD 400 (e.g., preceding figures). The computational analysis included a static thermomechanical finite element analysis utilizing ANSYS® Mechanical software (ANSYS 2019 R1) available from Ansys Inc. having headquarters in Canonsburg, Pa., USA.

Figure 14:
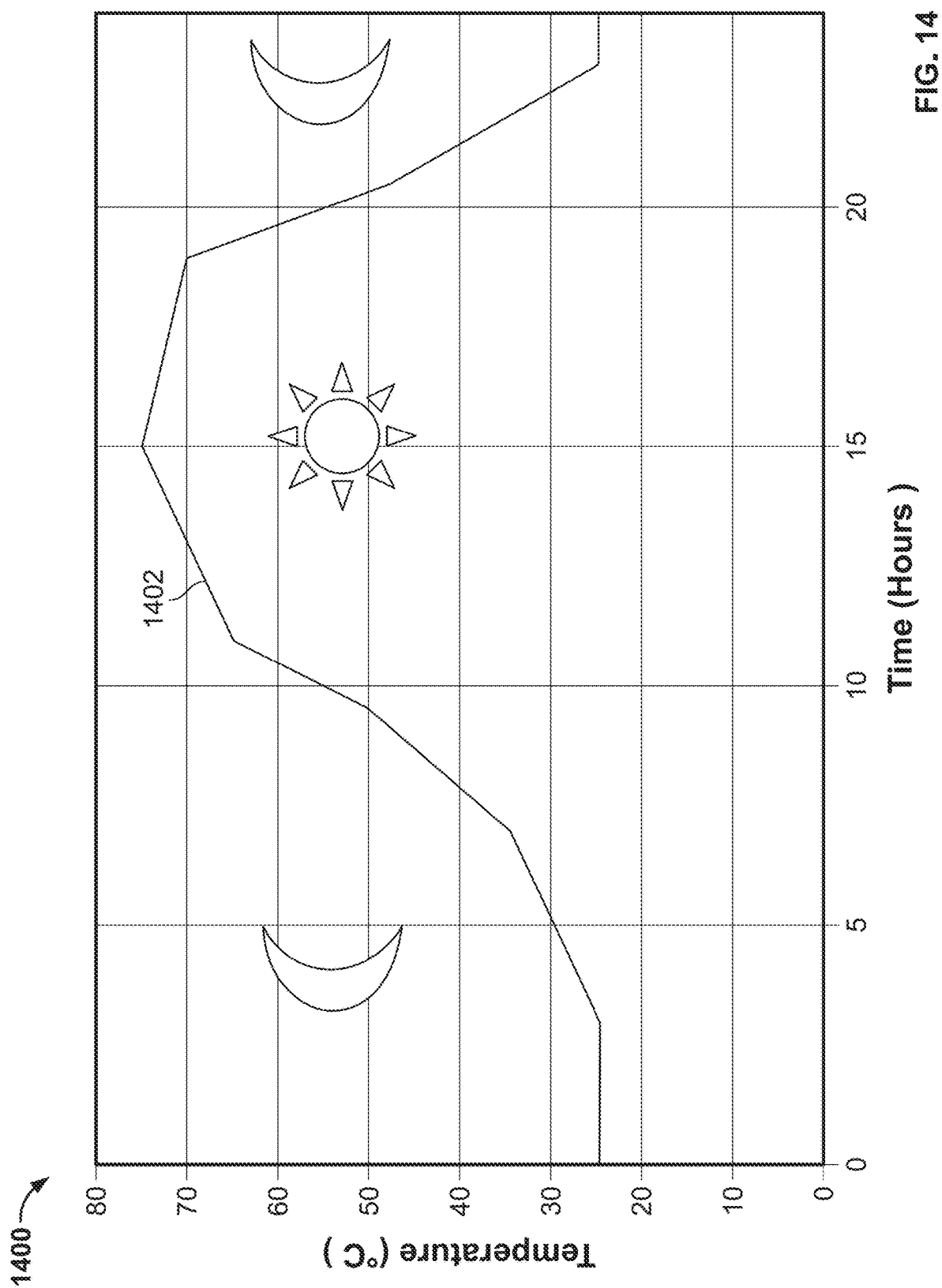
FIG. 14 is a plot of exemplary surface temperature of a pipeline in the desert of Saudi Arabia over a 24-hour period.

FIG. 14 is a plot 1400 of exemplary surface temperature of a pipeline in the desert of Saudi Arabia over a 24-hour period. The curve 1402 is a temperature profile of pipeline surface temperature of a diurnal cycle experienced in the desert of Saudi Arabia. The curve 1402 indicates lower temperatures during the night and higher temperatures during the day. The computational analysis in the Example considered this temperature variation or cycle. Table 1 gives material properties associated with the PCM-PTD that were input for the computational analysis. The pipeline was input as a steel pipeline (steel pipe).

TABLE 1

Material Properties

| Material | Young's modulus (MPa) | Poisson ratio | Thermal expansion ($K^{-1}$) | Density (kg/m$^3$) |
|---|---|---|---|---|
| Polyethylene Terephthalate (PET) | 1050 | 0.33 | 2.7e−4 | 950 |
| Epoxy | 2000 | 0.32 | 1.2e−5 | 1.4 |
| Phase Change Material (solid phase)* | 90 | 0.45 | 4e−4 | 900 |
| Phase Change Material (liquid phase)* | ~0 | 0.499 | 1e−3 | 777 |

*Data from computation fluid dynamics (CFD) simulation of melting of phase change material (PCM) in a spherical capsule.

Figure 15:
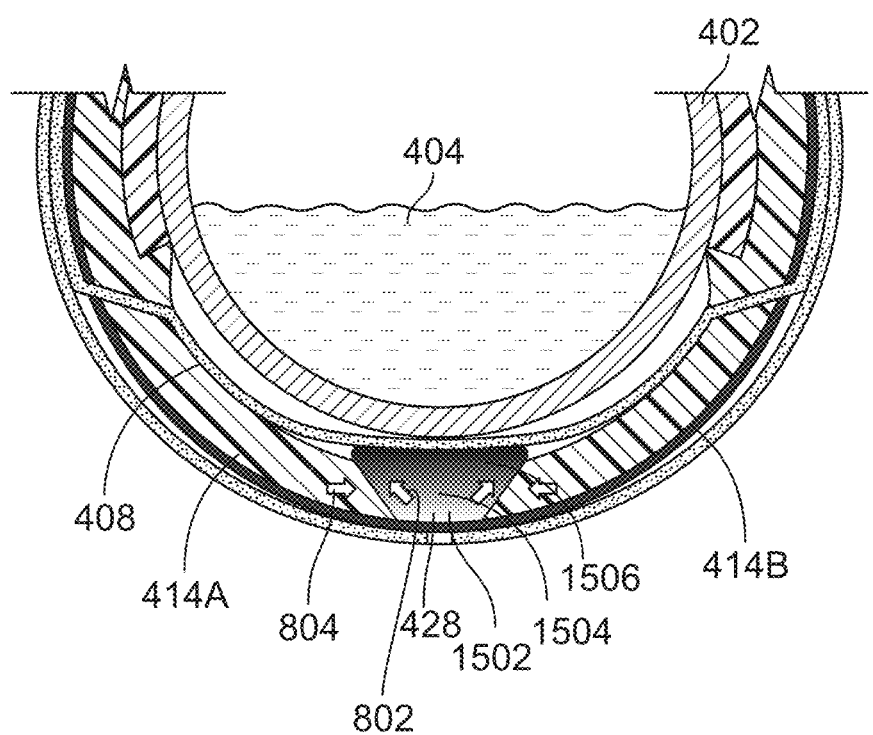
FIG. 15 is a diagram of computational output representation with respect to a lower portion of a PCM-PTD with consideration of the PCM bag pushing upwards.

FIG. 15 is a representation of computational output with respect to a lower portion 1500 of a PCM-PTD analogous to FIG. 8 and with consideration of the PCM bag 428 pushing upwards. As indicated, the computational analysis involved both structural analysis and thermomechanical analysis of the PCM-PTD. The movement of the graphene sheet 408 to give contact between the graphene sheet 408 (graphene membrane) and the steel pipeline 402 was evaluated. Two contributions to the movement were identified: (1) upward vertical displacement of the PCM bag 428 due to PCM thermal expansion, as indicated by arrows 802; and (2) upward vertical displacement of the PCM bag 428 due to lateral compression by the PET blocks 414A, 414B. The lateral compression was driven by thermal expansion of the PET blocks 414A, 414B. The left PET block 414A pushed toward to the right side. The right PET block 4146 pushed toward the left side.

Due to thermal expansion of the PCM and the PET, the PCM bag 428 moved up to occupy the free space of the air gap 422 above the PCM bag 428. In the computational structural analysis, the vertical displacement was in the approximate ranges of 2.4 mm to 4.0 mm in the bottom region 1502 of the PCM bag 428, 4.8 mm to 5.6 mm in the middle region 1504 of the PCM bag 428, and 6.0 mm to 6.4 mm in the upper region 1506 of the PCM bag 428.

Figure 16:
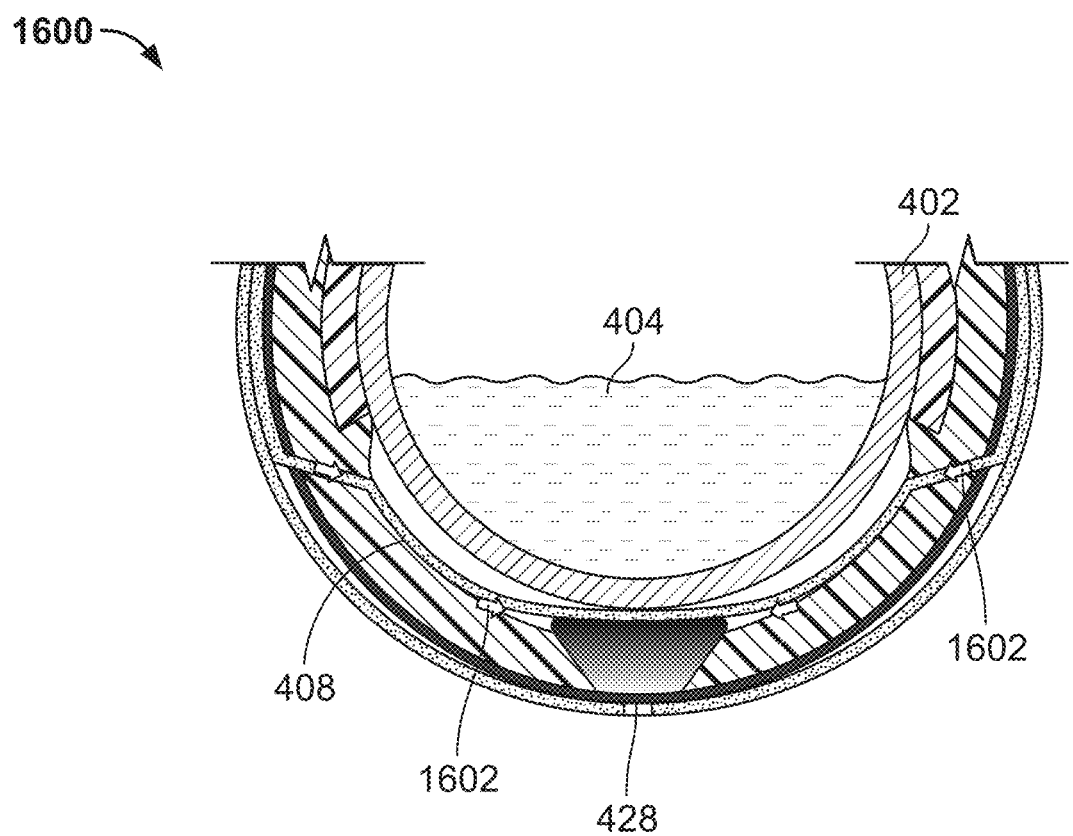
FIG. 16 is a diagram of computational output representation with respect to the lower portion of the PCM-PTD, and with consideration of heat transfer from the graphene sheet to the pipeline.

FIG. 16 is a representation of computational output with respect to the lower portion 1600 of the PCM-PTD, and with consideration of heat transfer from the graphene sheet 408 to the pipeline 402. The thermomechanical analysis demonstrated that thermal expansion within the PCM-PTD facilitates to bridge the 5 mm gap 422 (above the PCM bag 428) between the graphene sheet 408 and the pipeline 402, and therefore establish a connection between graphene sheet 408 and the steel pipeline 402. When contact is achieved, the graphene sheet 408 (graphene web) transfers heat flow to the steel pipeline 402, as referenced by arrows 1602. This heat flow 1602 provides for transported fluid 404 in the pipeline to absorb heat (from the environment). Such heat transfer to the pipeline 402 and heat absorption by the fluid 404 may be with little or negligible heat dissipation.

Figure 17:
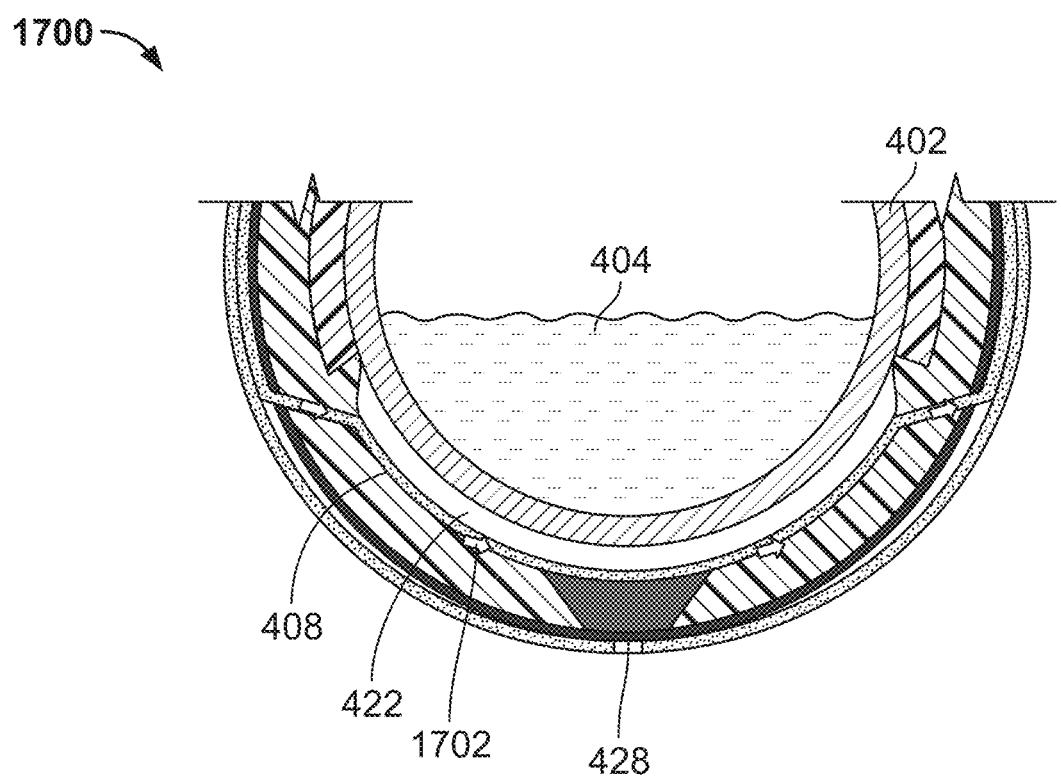
FIG. 17 is a diagram of computational output representation with respect to the lower portion of the PCM-PTD, and with disconnection between the graphene sheet and the pipeline.

FIG. 17 is a representation of computational output with respect to the lower portion 1700 of the PCM-PTD, and with disconnection between the graphene sheet 408 and the pipeline 402. When external temperature is below 60° C. (or a different temperature for a different application), the expansion of the PCM bag 428 and the right and left PET blocks 414A, 414B is not sufficient to cause the graphene sheet 408 to become in contact with the pipeline 402. Therefore, no thermal flow is transferred to the pipeline 402, as depicted in FIG. 17. Any heat transfer 1702 through the graphene sheet 408 does not affect the pipeline 402. In conclusion, the numerical analysis conducted in the Example demonstrated that the arrangement of the selected materials combined with the aforementioned described design and changes in external temperature allows to generate a displacement greater than the 5 mm air gap 422 located at the bottom portion of the PCM-PTD. Implementations of the PCM-PTD provide for reaching a displacement significant enough to trigger the PCM-PTD thermal switch and including with common and relatively inexpensive polymers of the PCM-PTD in certain instances. Verification was performed utilizing structural analysis.

This disclosure may be relevant to any region of the world and including desert regions. This disclosure may be relevant to pipeline transportation of fluids including relatively viscous fluids and including oil and gas transportation. The techniques may provide to passively control viscosity in crude oil transportation systems. The techniques may combine the advantages of the insulation material for the pipeline at low temperature to avoid thermal leaks and the absence (or bypass) of insulation material at higher temperatures which allows to decrease transported fluid viscosity. Such a PCM-PTD can be applied on pipelines in locations (e.g., desert locations or other locations) with typically large variations in temperature through a 24-hour period. The PCM-PTD can generally be applied to above-ground steel pipelines and may be increasingly beneficial where low ambient temperatures adversely impact (lower) transported fluid viscosity in such an extent that impacts the load of pump stations along the pipeline. Embodiments increase thermal inflow over a daily temperature cycle. The solution may combined the advantages of an insulator (to avoid thermal outflow at low external temperatures such as during the night) and the absence of an insulator (to benefit from thermal inflow at higher external temperatures).

Figure 18:
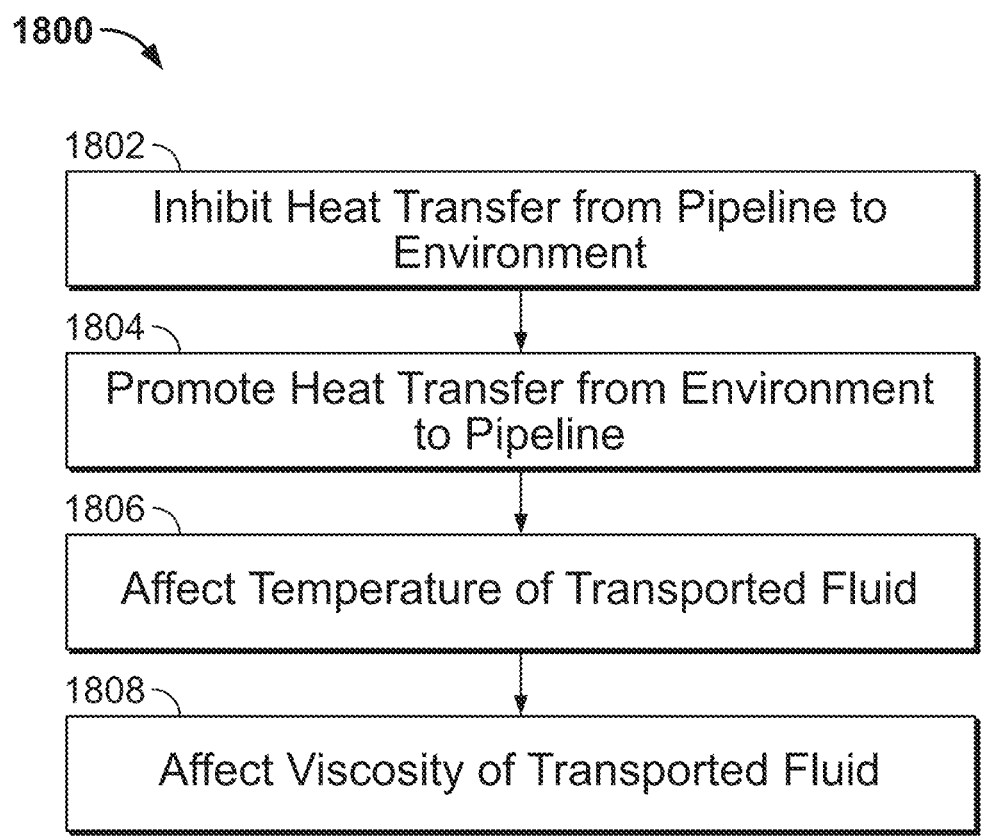
FIG. 18 is a block flow diagram of a method of operating a PTD on a pipeline.

FIG. 18 is a method 1800 is a method of operating a PTD (e.g., PCM-PTD) disposed on a pipeline. The pipeline may be a steel pipeline. In embodiments, electricity or power is not supplied to the PTD. This may be implicit in the term PTD.

At block 1802, the method includes inhibiting (via the PTD) heat transfer from the pipeline to the environment surrounding the pipeline. This inhibiting of heat transfer may be in response to an external temperature being below a threshold temperature. In certain embodiments, the threshold temperature is a deformation temperature of a phase change material (PCM) in the PTD. The external temperature may be an external surface temperature of the PTD. The external temperature may be a temperature of an external graphene sheet of the PTD.

The inhibiting of the heat transfer may involve inhibiting the heat transfer from the pipeline to the environment via an insulation material layer in an upper portion of the PTD and via a gap (e.g., air gap) in a lower portion of the PTD. In embodiments, the insulation material layer is adjacent the pipeline and the gap is adjacent the pipeline.

At block 1804, the method include promoting heat transfer from the environment to the pipeline. This inhibiting of heat transfer may be in response to the external temperature being above the threshold temperature. The promoting of the heat transfer may involve placing, via thermal expansion of a control material (e.g., PCM or PCM bag) in the PTD, a heat-transfer material layer (e.g., graphene sheet) of the PTD in contact with the pipeline. If so, the heat transfer from the environment to the pipeline involves heat transfer from the environment through the heat-transfer material layer to the pipeline. The placing of the heat-transfer material layer into contact with the pipeline may involve moving the heat-transfer material layer within the gap to contact the pipeline, and wherein the heat transfer through the heat-transfer material layer bypasses the insulation material layer The heat-transfer material layer may include or be thermally coupled to an external graphene sheet. Thus, the heat transfer from the environment to the pipeline may include heat transfer from the external graphene sheet to the heat-transfer material layer (e.g., an internal graphene sheet).

The PTD may include a polymer layer having two sections and with the control material residing between the two sections. If so, the heat-transfer material layer may be placed in contact with the pipeline via compression exerted by the two sections on the control material via thermal expansion of the two sections.

At block 1806, the method includes affecting the temperature of the transported fluid in the pipeline. The inhibiting of heat transfer (block 1802) from the pipeline to the environment (e.g., when the external temperature is below a threshold) may maintain the temperature of the fluid in the pipeline. This inhibiting of heat transfer may prevent or reduce fluid temperature decrease. The promoting of heat transfer (block 1804) from the environment to the pipeline (e.g., when the external temperature is above a threshold) may increase the temperature of the fluid in the pipeline.

At block 1808, the method includes affecting viscosity of the transported fluid in the pipeline. For example, the aforementioned preventing or reducing fluid temperature decrease beneficially prevents or reduces fluid viscosity decrease. The aforementioned increased in temperature of the fluid in the pipeline beneficially reduces the viscosity of the transported fluid.

An embodiment is a method of operating a PTD disposed on a pipeline. The method includes inhibiting, via the PTD, heat transfer from the pipeline to the environment in response to an external temperature being below a threshold temperature. The method includes promoting, via the PTD, heat transfer from the environment to the pipeline in response to the external temperature being above the threshold temperature. In implementations, electricity is not supplied to the PTD. Heat transfer from the environment to the pipeline may increase temperature of the fluid transported in the pipeline. Heat transfer from the environment to the pipeline may decrease viscosity of the fluid transported in the pipeline. The external temperature may include an external surface temperature of the PTD. In implementations, the external temperature may include a temperature of an external graphene sheet of the PTD. In some implementations, the threshold temperature may be a deformation temperature of a PCM in the PTD. The PCM may be a PCM bag. The promoting of the heat transfer may include placing, via thermal expansion of a control material (e.g., PCM) in the PTD, a heat-transfer material layer of the PTD in contact with the pipeline, wherein the heat transfer from the environment to the pipeline includes heat transfer from the environment through the heat-transfer material layer (e.g., a graphene sheet) to the pipeline. The PTD may have a polymer layer having at least two sections. The control material may reside between the two sections. The heat-transfer material layer is placed in contact with the pipeline via compression exerted by the two sections on the control material via thermal expansion of the two sections. The heat-transfer material layer may include a graphene sheet thermally coupled to an external graphene sheet, and wherein the heat transfer from the environment to the pipeline comprises heat transfer from the external graphene sheet to the graphene sheet. The inhibiting of the heat transfer may include inhibiting the heat transfer from the pipeline to the environment via an insulation material layer in an upper portion of the PTD. The inhibiting of the heat transfer may include inhibiting the heat transfer from the pipeline to the environment via an air gap in a lower portion of the PTD.

Another embodiment is a method of operating a PTD disposed on a pipeline, such as on a steel pipeline. In implementations, power is not supplied to the PTD. The method includes inhibiting heat transfer from the pipeline to environment via an insulation material layer (e.g., adjacent the pipeline) in an upper portion of the PTD and via a gap (e.g., adjacent the pipeline) in a lower portion of the PTD. This inhibiting of heat transfer may be in response to an external temperature being less than a threshold temperature. The external temperature may include an external surface temperature of the PTD or a temperature of an external graphene sheet of the PTD, or a combination thereof. The method includes placing a heat-transfer material layer of the PTD in contact with the pipeline to provide for heat transfer from the environment through the heat-transfer material layer (e.g., graphene sheet) to the pipeline, wherein the heat-transfer material layer is placed in contact with the pipeline via thermal expansion of a control material (e.g., PCM) in the PTD. The placing of the heat-transfer material layer in contact with the pipeline may involve moving the heat-transfer material layer within the gap to contact the pipeline, and wherein the heat transfer through the heat-transfer material layer bypasses the insulation material layer. The placing of the heat-transfer material layer of the PTD in contact with the pipeline to provide for heat transfer from the environment through the heat-transfer material layer to the pipeline may be in response to the external temperature exceeding the threshold temperature. For a graphene sheet as the heat-transfer material layer, the graphene sheet may be thermally coupled to an external graphene sheet, and wherein the heat transfer from the environment to the pipeline involves heat transfer from the external graphene sheet through the graphene sheet to the pipeline.

Yet another embodiment is a system including a pipeline (e.g., steel pipeline) and a PTD disposed radially around the pipeline. In implementations, electricity is not supplied to the PTD. The PTD includes a polymer shell, an inner polymer layer adjacent the polymer shell, and a graphene layer (e.g., graphene sheet) between the inner polymer layer and the pipeline in a lower portion of the PTD. The PTD may include an insulation material layer between the inner polymer layer and the pipeline in an upper portion of the PTD. The PTD includes a control material (e.g., PCM or PCM bag) to move the graphene layer into contact with the pipeline. The control material may move the graphene layer into contact with the pipeline via thermal expansion of the control material, and wherein the control material is disposed between the graphene layer and the polymer shell. The control material may move the graphene layer into contact with the pipeline via thermal expansion of the control material in response to an external temperature exceeding a threshold. A portion of the graphene layer may be disposed in a gap between the inner polymer layer and the pipeline. The graphene layer may be a graphene sheet. The graphene sheet may be thermally coupled with an external graphene sheet disposed on the polymer shell. The inner polymer layer may include a left section and a right section, and wherein the control material is disposed between the left section and the right section. The left section and the right section may exert compression on the control material to facilitate movement of the graphene layer in the gap into contact with the pipeline in response to an external temperature exceeding a threshold.

Yet another embodiment is a PTD with PCM giving a PCM-PTD for a pipeline. The PCM-PTD includes a polymer shell, an inner polymer layer adjacent the polymer shell, and an insulation material layer adjacent the inner polymer layer in an upper portion of the PCM-PTD. The thermal expansion coefficient of the inner polymer layer may be different than the thermal expansion coefficient of the polymer shell. The insulation material layer may inhibit heat transfer between the pipeline and the environment. The PCM-PTD includes a heat-transfer material layer adjacent the inner polymer layer in a lower portion of the PCM-PTD to promote heat transfer from environment to the pipeline in response to an external temperature exceeding a threshold. The external temperature may be a surface temperature of the PCM-PTD. The threshold may be a deformation temperature (Tt) of the PCM. The heat-transfer material layer may be a graphene sheet or graphene web, or a combination thereof. The PCM (e.g., PCM bag) moves the heat-transfer layer into contact with the pipeline via thermal expansion of the PCM in response to the external temperature exceeding the threshold.

A number of implementations have been described. Nevertheless, it will be understood that various modifications may be made without departing from the spirit and scope of the disclosure.

What is claimed is:

1. A method of operating a passive thermal diode (PTD) disposed on a pipeline, comprising:
    inhibiting, via the PTD, heat transfer from the pipeline to environment in response to an external temperature being below a threshold temperature; and
    promoting, via the PTD, heat transfer from the environment to the pipeline in response to the external temperature being above the threshold temperature, wherein promoting the heat transfer comprises placing a heat-transfer material layer in contact with the pipeline via thermal expansion of a control material in the PTD, and wherein the heat transfer from the environment to the pipeline comprises heat transfer from the environment through the heat-transfer material layer to the pipeline.

2. The method of claim 1, wherein the external temperature comprises an external surface temperature of the PTD, and wherein heat transfer from the environment to the pipeline increases temperature of a fluid transported in the pipeline.

3. The method of claim 1, wherein the external temperature comprises a temperature of an external graphene sheet of the PTD, and wherein heat transfer from the environment to the pipeline decreases viscosity of a fluid transported in the pipeline.

4. The method of claim 1, wherein the threshold temperature comprises a deformation temperature of a phase change material (PCM) in the PTD, and wherein electricity is not supplied to the PTD.

5. The method of claim 1, wherein the heat-transfer material layer comprises a graphene sheet.

6. The method of claim 1, wherein the control material comprises a phase change material (PCM).

7. The method of claim 6, wherein the threshold temperature comprises a deformation temperature of the PCM, and wherein the PCM comprises a PCM bag.

8. The method of claim 1, wherein the PTD comprises a polymer layer comprising two sections, wherein the control material resides between the two sections, and wherein the heat-transfer material layer is placed in contact with the pipeline via compression exerted by the two sections on the control material via thermal expansion of the two sections.

9. The method of claim 1, wherein the heat-transfer material layer comprises a graphene sheet thermally coupled to an external graphene sheet, and wherein the heat transfer from the environment to the pipeline comprises heat transfer from the external graphene sheet to the graphene sheet.

10. The method of claim 1, wherein the inhibiting the heat transfer comprises inhibiting the heat transfer from the pipeline to the environment via an insulation material layer in an upper portion of the PTD.

11. The method of claim 1, wherein the inhibiting the heat transfer comprises inhibiting the heat transfer from the pipeline to the environment via an air gap in a lower portion of the PTD.

12. A method of operating a passive thermal diode (PTD) disposed on a pipeline, comprising:
   inhibiting heat transfer from the pipeline to environment via an insulation material layer in an upper portion of the PTD and via a gap in a lower portion of the PTD; and
   placing a heat-transfer material layer of the PTD in contact with the pipeline to provide for heat transfer from the environment through the heat-transfer material layer to the pipeline, wherein the heat-transfer material layer is placed in contact with the pipeline via thermal expansion of a control material in the PTD.

13. The method of claim 12, wherein the control material comprises a phase change material (PCM), and wherein power is not supplied to the PTD.

14. The method of claim 12, wherein the heat-transfer material layer comprises a graphene sheet, and wherein the pipeline comprises a steel pipeline.

15. The method of claim 14, wherein the graphene sheet is thermally coupled to an external graphene sheet, and wherein the heat transfer from the environment to the pipeline comprises heat transfer from the external graphene sheet through the graphene sheet to the pipeline.

16. The method of claim 12, wherein the insulation material layer is adjacent the pipeline, and wherein the gap is adjacent the pipeline.

17. The method of claim 16, wherein placing the heat-transfer material layer in contact with the pipeline comprises moving the heat-transfer material layer within the gap to contact the pipeline, and wherein the heat transfer through the heat-transfer material layer bypasses the insulation material layer.

18. The method of claim 12, wherein inhibiting heat transfer is in response to an external temperature being less than a threshold temperature, and wherein placing a heat-transfer material layer of the PTD in contact with the pipeline to provide for heat transfer from the environment through the heat-transfer material layer to the pipeline is in response to the external temperature exceeding the threshold temperature.

19. The method of claim 18, wherein the external temperature comprises an external surface temperature of the PTD or a temperature of an external graphene sheet of the PTD, or a combination thereof.

* * * * *